US010286585B2

(12) United States Patent
Korley et al.

(10) Patent No.: US 10,286,585 B2
(45) Date of Patent: May 14, 2019

(54) FIBER REINFORCED HYDROGELS AND METHODS OF MAKING SAME

(71) Applicant: Case Western Reserve University, Cleveland, OH (US)

(72) Inventors: LaShanda T. J. Korley, Cleveland, OH (US); Gary E. Wnek, Cleveland, OH (US); Alexander M. Jordan, Wexford, PA (US)

(73) Assignee: Case Western Reserve University, Cleveland, OH (US)

( * ) Notice: Subject to any disclaimer, the term of this patent is extended or adjusted under 35 U.S.C. 154(b) by 69 days.

(21) Appl. No.: 15/239,808

(22) Filed: Aug. 17, 2016

(65) Prior Publication Data

US 2017/0050364 A1 Feb. 23, 2017

Related U.S. Application Data

(60) Provisional application No. 62/206,232, filed on Aug. 17, 2015.

(51) Int. Cl.
*B29C 47/00* (2006.01)
*B29C 47/02* (2006.01)
(Continued)

(52) U.S. Cl.
CPC ........ *B29C 47/0004* (2013.01); *B29C 47/025* (2013.01); *B29C 47/707* (2013.01);
(Continued)

(58) Field of Classification Search
CPC . B29C 47/0004; B29C 47/025; B29C 47/707; C08G 2210/00; C08G 18/4277;
(Continued)

(56) References Cited

U.S. PATENT DOCUMENTS

| | | | | |
|---|---|---|---|---|
| 5,094,793 A * | 3/1992 | Schrenk | B01F 5/0644 | 264/173.15 |
| 2004/0091677 A1* | 5/2004 | Topolkaraev | A61F 13/15252 | 428/184 |
| 2005/0287191 A1* | 12/2005 | Munro | C08F 2/44 | 424/443 |
| 2006/0193578 A1* | 8/2006 | Ouderkirk | B29C 47/0004 | 385/115 |

(Continued)

FOREIGN PATENT DOCUMENTS

| | | | |
|---|---|---|---|
| GB | 1236097 A * | 6/1971 | B29C 47/062 |
| WO | WO-2011019408 A1 * | 2/2011 | B29C 47/707 |
| WO | WO-2013155519 A1 * | 10/2013 | B29C 47/06 |

OTHER PUBLICATIONS

Wang et al, "Manufacturing of polymer continuous nanofibers using a novel co-extrusion and multiplication technique", 2014, Polymer, 55, pp. 673-685. (Year: 2014).*

*Primary Examiner* — Anthony Calandra
*Assistant Examiner* — Jerzi H Moreno Hernandez
(74) *Attorney, Agent, or Firm* — Benesch, Friedlander, Coplan & Aronoff LLP

(57) ABSTRACT

Disclosed herein are biomaterials that include a plurality of fibers embedded in a matrix of hydrogel material. The plurality of fibers and hydrogel material are formed during one process step. In one embodiment, the plurality of fibers and hydrogel materials are formed using a multilayer coextrusion process step. Additional process steps can be performed to form a tissue engineering scaffold. Such a scaffold can be used to grow biological matter. In one embodiment, stem cells are applied to the scaffold to grow biological material. Process steps can be controlled to determine certain mechanical properties of the resulting biomaterial. In one embodiment, the process steps are controlled to determine the stiffness of the resulting biomaterial. In such an embodiment, the stiffness of the resulting biological material
(Continued)

determines physical properties of the biological material grown on the scaffold.

5 Claims, 37 Drawing Sheets

(51) Int. Cl.

| | |
|---|---|
| ***B29C 47/70*** | (2006.01) |
| *B29K 71/00* | (2006.01) |
| *B29K 267/00* | (2006.01) |
| *C08G 18/42* | (2006.01) |

(52) U.S. Cl.
CPC .... *B29K 2071/02* (2013.01); *B29K 2267/046* (2013.01); *B29K 2995/006* (2013.01); *C08G 18/4277* (2013.01); *C08G 2210/00* (2013.01)

(58) Field of Classification Search
CPC ........ B29K 2995/006; B29K 2267/046; B29K 2071/02; A61F 2/2418; A61L 27/52
See application file for complete search history.

(56) References Cited

U.S. PATENT DOCUMENTS

2010/0179659 A1* 7/2010 Li .......................... A61F 2/441 623/17.16
2010/0233458 A1* 9/2010 Sun .......................... D01F 2/28 428/292.1
2011/0008443 A1* 1/2011 Alsberg ................. A61L 27/38 424/488
2013/0261208 A1* 10/2013 Borges De Couraca ................... A61L 27/26 522/33
2015/0105863 A1* 4/2015 Zussman ................ A61L 27/52 623/23.72
2015/0298380 A1* 10/2015 Guillemette ........ B29C 47/0016 264/138
2018/0147767 A1* 5/2018 Grolman ................. D01D 5/34

* cited by examiner

| Sample | PCL Integration | PEO Integration | $W_f$ | $W_c$ |
|---|---|---|---|---|
| $PEO_{20}PCL_{10}$ | 0.0845 | 1.00 | 0.305 | 0.321 |
| $PEO_{22}PCL_{8}$ | 0.0559 | 1.00 | 0.224 | 0.256 |
| $PEO_{24}PCL_{6}$ | 0.0348 | 1.00 | 0.153 | 0.161 |
| $PEO_{26}PCL_{4}$ | 0.0237 | 1.00 | 0.109 | 0.127 |
| $PEO_{28}PCL_{2}$ | 0.0124 | 1.00 | 0.060 | 0.063 |
| $PEO_{29}PCL_{1}$ | 0.0052 | 1.00 | 0.026 | 0.032 |

Polyethylene oxide (PEO)

- Blend of:
  - Dow PolyOx WSR N:10
  - Dow PolyOx WSR N:80

Poly(ε-caprolactone) (PCL)

- CAPA 6800

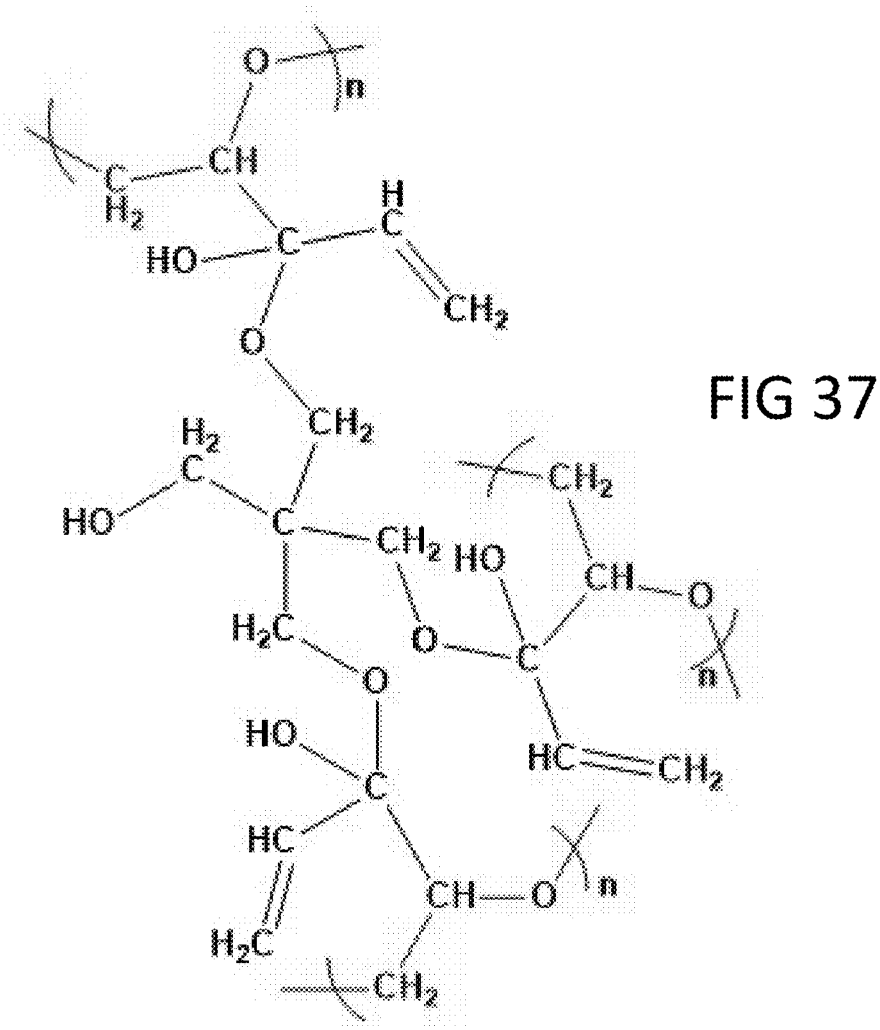
FIG 37
FIG 38
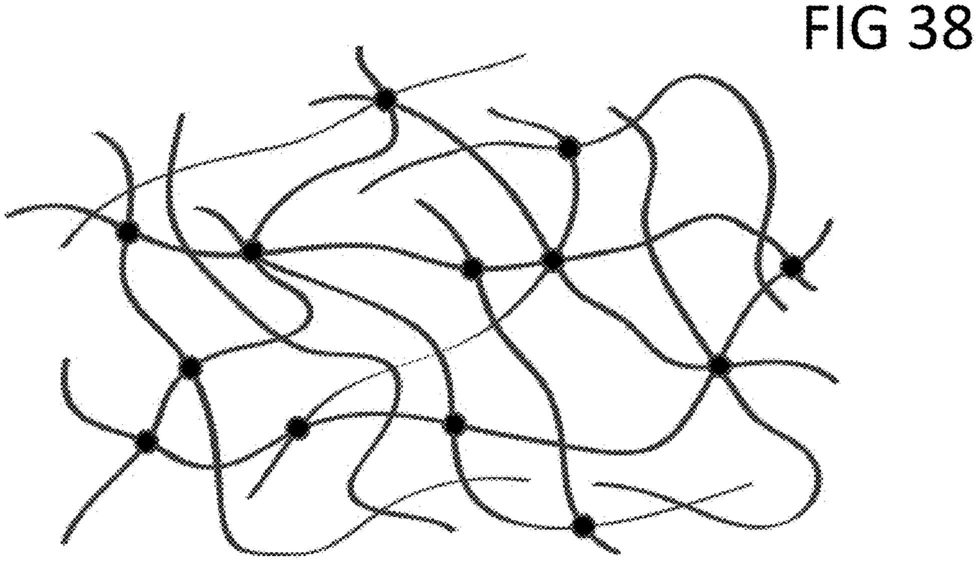

(Blue = DNA, Green = Cell Body)

FIBER REINFORCED HYDROGELS AND METHODS OF MAKING SAME

RELATED APPLICATION

This application claims priority to U.S. Provisional Patent Application Ser. No. 62/206,232, titled "Fiber Reinforced Hydrogels and Methods of Making Same," which was filed on Aug. 17, 2015, which is expressly incorporated by reference herein in its entirety.

FIELD OF INVENTION

The present disclosure generally relates to fiber reinforced hydrogels and methods of fabrication. More specifically, the present disclosure relates to fiber reinforced hydrogels and a process for forming the fibers and the hydrogel material together.

BACKGROUND

In recent years, the area of biomaterials has received much attention from commercial interests, academia, and government agencies. Generally, a biomaterial is a material that is designed to interact with biological systems. Biomaterials can take many forms including a homogenous material, a blended material, or composite material. Often such biomaterials are designed to have usefulness in the medical field for diagnostic as well as therapeutic purposes. Biomaterials can be formed from natural as well as synthetic materials and can include polymers, metals, ceramics, and many other materials.

While the attention paid to biomaterials has resulted in the development of many new materials, improvements to existing materials, and new and improved fabrication techniques, there remains substantial need for new biomaterials and new techniques and processes for fabricating biomaterials. Disclosed herein are novel methods for fabricating novel biomaterials.

SUMMARY

Disclosed herein are biomaterials that include a plurality of fibers embedded in a matrix of hydrogel material. The plurality of fibers and hydrogel material are formed during one process step. In one embodiment, the plurality of fibers and hydrogel materials are formed using a multilayer coextrusion process step. Additional process steps can be performed to form a tissue engineering scaffold. Such a scaffold can be used to grow biological matter. In one embodiment, stem cells are applied to the scaffold to grow biological material. Process steps can be controlled to determine certain mechanical properties of the resulting biomaterial. In one embodiment, the process steps are controlled to determine the stiffness of the resulting biomaterial. In such an embodiment, the stiffness of the resulting biological material determines physical properties of the biological material grown on the scaffold.

BRIEF DESCRIPTION OF THE DRAWINGS

In the accompanying drawings, structures are illustrated that, together with the detailed description provided below, describe example embodiments of the claimed invention. Where appropriate, like elements are identified with the same or similar reference numerals. Elements shown as a single component may be replaced with multiple components. Elements shown as multiple components may be replaced with a single component. The drawings may not be to scale. The proportion of certain elements may be exaggerated for the purpose of illustration.

FIG. 37 schematically illustrates structure of covalent crosslinking.

FIG. 38 schematically illustrates structure of covalent crosslinking.

DETAILED DESCRIPTION

Figure 1:
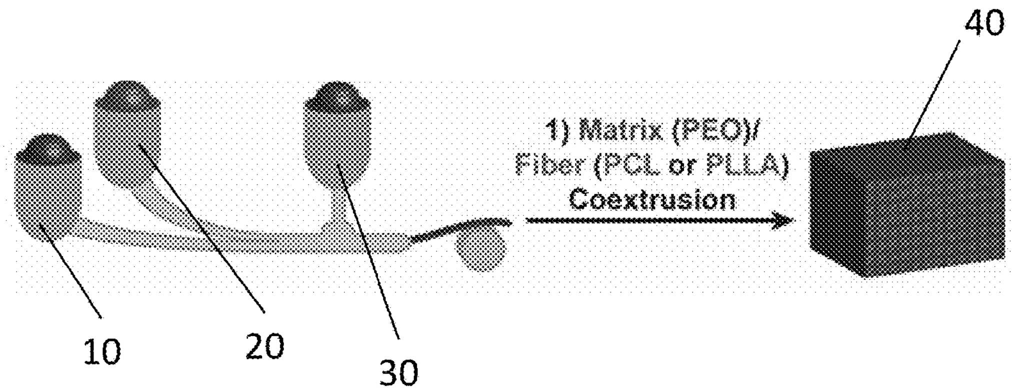
FIG. 1 schematically illustrates a multilayer coextrusion apparatus.

The apparatus, systems, arrangements, and methods disclosed in this document are described in detail by way of examples and with reference to the figures. It will be appreciated that modifications to disclosed and described examples, arrangements, configurations, components, elements, apparatus, methods, materials, etc. can be made and may be desired for a specific application. In this disclosure, any identification of specific techniques, arrangements, method, etc. are either related to a specific example presented or are merely a general description of such a technique, arrangement, method, etc. Identifications of specific details or examples are not intended to be and should not be construed as mandatory or limiting unless specifically designated as such. Selected examples of apparatus, arrangements, and methods for forming fiber reinforced hydrogels are hereinafter disclosed and described in detail with reference made to FIGS. 1-52.

Hydrogels are a class of biomaterials that can be useful in many biological applications. A hydrogel by its nature does not have superior mechanical properties (i.e., hydrogels have relatively low mechanical strength and structural integrity). The usefulness and breadth of practical applications for hydrogels can be significantly increased if hydrogels can be fabricated with improved mechanical properties. For example, novel fabrication processes that improve mechanical properties for hydrogels can result in novel hydrogel composites that are useful for a number of biological applications such as, for example, cell proliferation, drug delivery systems, topical applications such as wound care, and implantable structural components.

Disclosed herein are novel hydrogel composites and novel methods for fabricating such hydrogel composites. In one embodiment, a novel fabrication method results in a hydrogel composite with improved mechanical properties, where the structure and arrangement of the hydrogel composite is consistent throughout the hydrogel composite, is reproducible from one fabricated hydrogel to the next, and where the physical properties of the hydrogel composite are controllable and adjustable (i.e., "tunable"). Such a novel method of fabrication provides for the fabrication of hydrogel composites that span a substantial range of physical properties.

The novel hydrogel composites can be used for cell proliferation. This is to say that the novel hydrogel composites can be used as a substrate to grow biological tissue including soft tissue such as skin and hard tissue such as bone. The novel hydrogel composites can be used as drug delivery systems. In one embodiment, a drug can be introduced into the fibers of the composite. The composite can be implanted into a human body, where the hydrogel material will biodegrade and be absorbed by the body at a predictable rate. Such degradation will expose embedded fibers to the body also at a controllable rate. The drug introduced into the fibers will release the drug upon exposure to the human body, and thus, release the drug over time and at a predictable rate. In one embodiment, the hydrogel composite can be arranged to be relatively thin so as to be topically applied to the human body to cover wounds or to deliver a drug to the human. In one embodiment, the hydrogel composite can be arranged to have the mechanical properties required to serve as part of an implantable device in the human body. As previously described, the hydrogel composite can be fabricated with a variety of mechanical properties and can be biodegradable such that it will be absorbed by the human body over time.

In one embodiment, hydrogels can be manufactured with fibers imbedded in the hydrogel. Such embedded fibers can provide for improved mechanical properties. This is to say that embedded fibers can increase the hydrogel's ability to maintain structural integrity when subjected to various physical forces such as tension, compression, shear, etc. Such embedded fibers can improve the mechanical properties of the hydrogel in part by providing for modes of energy dissipation when the hydrogel is deformation due to the application of a load or other force. For example, a fiber can absorb the load and fracture, deform, or "pulling out" of its physical position, all which can have the effect of dissipating energy that would normally be absorbed by the hydrogel itself. It will be understood that such arrangements can improve the stiffness and stability of the hydrogel, the shear storage modulus, the tensile strength, etc. Additional physical properties of the hydrogel can be enhanced or otherwise controlled or tuned by the addition of fibers. In one example, the embedding of fibers in the hydrogel can additionally effect the water-uptake of the hydrogel. The specific arrangement of the fibers in the hydrogel can be arranged to increase or decrease the amount of water-uptake for the hydrogel.

As noted herein, one exemplary use for hydrogels is as tissue engineering scaffolds. A tissue engineering scaffold mimics the extracellular matrix (ECM) that is found in nature. Such scaffolds can provide a for cell adhesion, proliferation, and differentiation, particularly when the structure of a hydrogel scaffold is controllable. Natural materials, such as proteins and polysaccharides, are often used to form hydrogels for tissue engineering applications due to their inherent biocompatibility, lack of immunogenicity, and flexibility in network formation via the diversity of their chemical structures. However, these natural materials have weak mechanical properties and are not mechanically stable over the long-term, which make them poor fits for many applications.

Certain polymers, such as poly(ethylene glycol) (PEG) and its high molecular weight analogue poly(ethylene oxide) (PEO), can be used to fabricate synthetic hydrogels for biological applications. PEG and PEO are good candidates because of their inert biological response, non-immunogenic/nontoxic nature, clearance of degradable crosslinking agents and low molecular weight PEG chains. However, like the natural materials previously discussed, PEO, PEG, and other synthetic materials used to fabricate hydrogels also have inherently weak mechanical properties, which limits their use as scaffolds and many other biological applications.

Improvements can be made in hydrogels by the inclusion of fibers into the hydrogel to form fiber reinforced hydrogels. Such fibers can be fabricated on the mico-scale and nano-scale, and the fibers can be distributed throughout the volume of the hydrogel. One fabrication method useful in achieving this goal of embedding micro-scale and nano-scale fibers in a hydrogel includes the use of multilayer coextrusion. Multilayer coextrusion is a continuous solvent-free process that utilized a scalable, melt processing technique to fabricate polymer composites containing distributed domains of fibers in a hydrogel matrix. Once fibers are embedded in a hydrogel matrix via a multilayer coextrusion process to form a fiber reinforced hydrogel, various crosslinking strategies can be implemented to tune the mechanical properties of the fiber reinforced hydrogel. One such strategy is to use ultraviolet (UV) covalent crosslinking to tune the mechanical properties. Another strategy is to post-process the fiber reinforced composite to fabricate additional structures for use as biomaterials.

As used herein, the term "fiber-matrix composite" will be used to describe novel fiber reinforced hydrogels. It will be understood that the term "matrix" will generally refer to the traditional hydrogel material, and the term "fiber" will generally refer to the fiber-shaped materials that are embedded in the hydrogel to affect the mechanical properties or other physical properties of the hydrogel composite.

In one embodiment, fiber reinforced hydrogels can be used as a substrate to grow cells. For example, a fiber reinforced hydrogel can be used to grow fibroblast cells or dermoblast cells. The rigidity or stiffness of the fiber reinforced hydrogel can be tuned to affect the type of cells grown on the hydrogel. For example, if the hydrogel is more rigid, the cells grown can also be more rigid, i.e., grow into bone tissue. If the hydrogel is less rigid, the cells grown can also be less rigid, i.e., grow into skin tissue. Such tunable hydrogel composites can be particularly useful as a substrate for stem cells, which have the potential to grow into a many different types of biological material.

FIGS. 1-8 illustrate exemplary methods of fabricating a fiber reinforced hydrogel. The multilayer coextrusion process is a continuous process that fabricates composite "tapes." The process is melt-based, which provides access to a wide range of polymers and polymer pairings. Composites fabricated by multilayer extrusion can include generally rectangular fibers and generally circular fibers. The fibers can be selected to control the specific surface area, such as using a geometry for the fibers that results in a relatively high specific surface area. Exemplary materials for use in such methods include PEO as the matrix and poly(ε-caprolactone) (PCL), poly(lactic acid) (PLA) or poly(L-lactic acid) (PLLA) as the fiber. Such processes can be referred to as in situ hydrogel fabrication.

FIG. 1 generally illustrates a multi-layer coextrusion process for forming a fiber reinforced hydrogel. The exemplary multilayer coextrusion process includes combining two materials into a composite. The process begins by placing two different materials into three receptacles 10, 20, and 30. Two of the receptacles 10, 30 are filled with the matrix material, PEO in this example. The third receptacle 20 is filled with the fiber material, in this case PCL, PLA or PLLA. The matrix material from receptacle 10 and the fiber material from receptacle 20 are processed through a series of dies to form a structure with fibers embedded in a matrix (see resulting fiber reinforced hydrogel, indicated as reference number 40).

Figure 2:
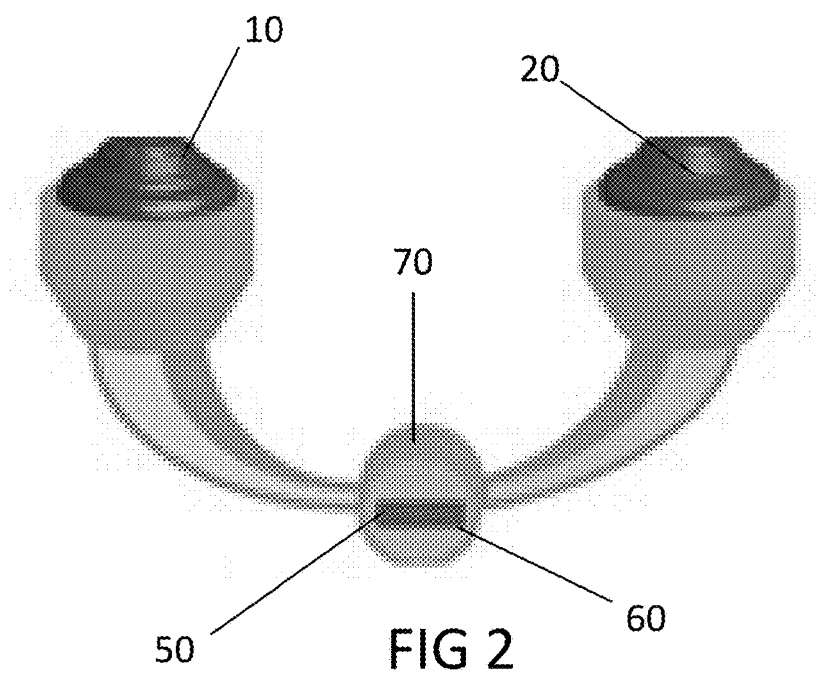
FIG. 2 schematically illustrates a component of the multilayer coextrusion apparatus.
Figure 3:
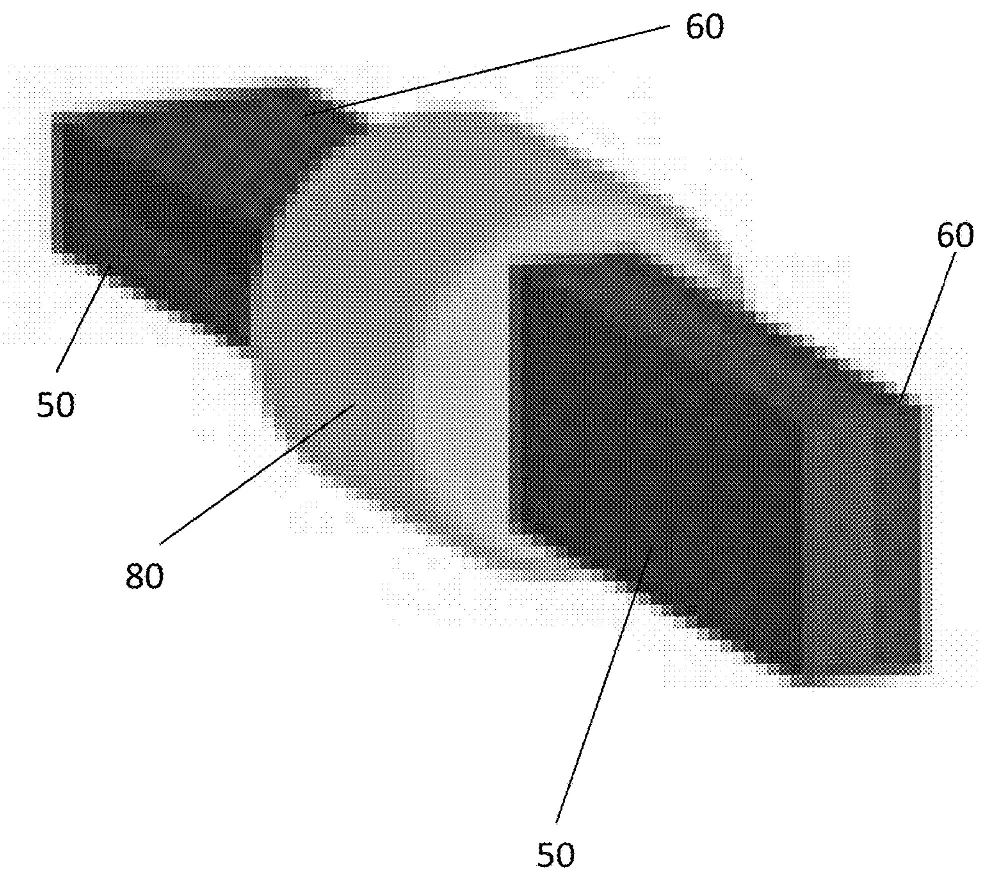
FIG. 3 schematically illustrates a component of the multilayer coextrusion apparatus.
Figure 4:
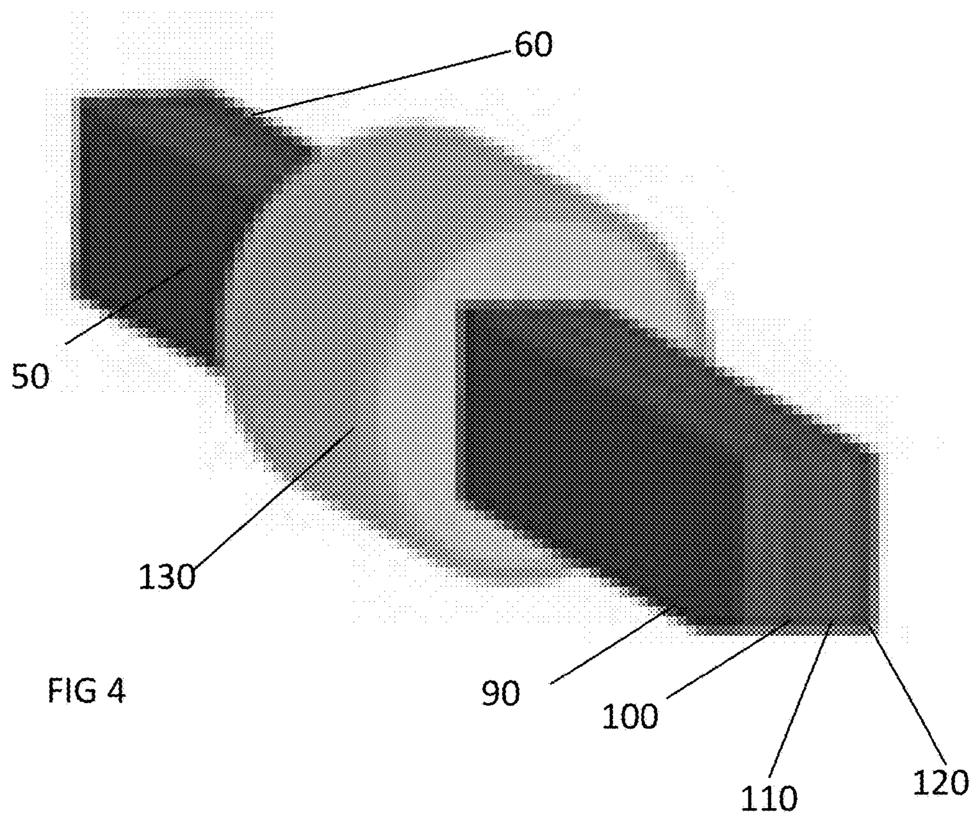
FIG. 4 schematically illustrates a component of the multilayer coextrusion apparatus.
Figure 5:
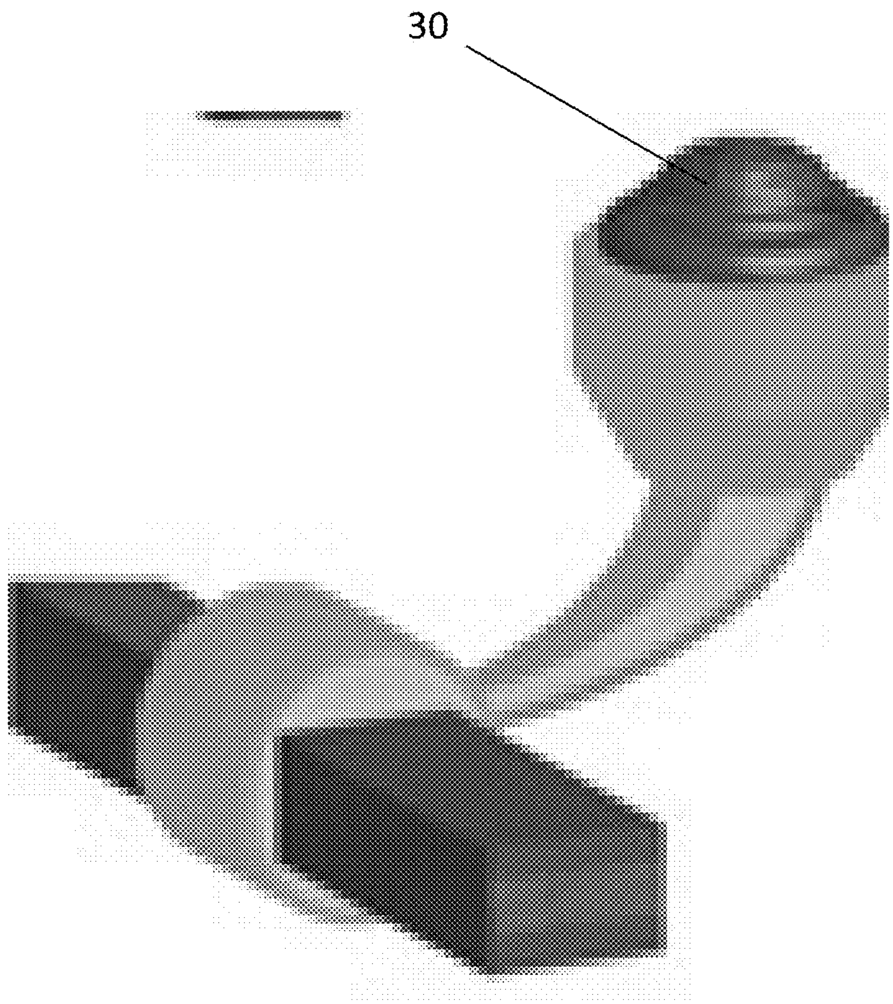
FIG. 5 schematically illustrates a component of the multilayer coextrusion apparatus.

FIGS. 2-6 further illustrate details of the multilayer coextrusion process. As illustrated in FIG. 2, a first step is to form a pair of horizontal layers from the matrix material and the fiber material. The two horizontal layers 50, 60 can be seen in FIG. 2 exiting a first die 70. Once the horizontal layers are formed, a next step (as illustrated in FIG. 3) is to rotate the layers 50, 60 to a vertical position through a second die 80. As illustrated in FIG. 3, the two layers 50, 60 are rotated clockwise to the vertical position. A next step, as illustrated in FIG. 4, is to "multiply" the vertical layers 50, 60 from two layers to four layers 90, 100, 110, 120 using a third die 130. The step illustrated in FIG. 4 can be repeated multiple times, each time duplicating the number of layers. The number of times the layers are "multiplied" can be varied based on desired results. A forth step, as illustrated in FIG. 5 is to apply a skin layer on the composite. In this illustration, the skin layer is a layer of the matrix material. It will be understood that the composite can be "multiplied" when the layers are horizontal as well as vertical, and that the composite can be "multiplied" in a vertical orientation and in a horizontal orientation in the same multilayer coextrusion process. It will also be understood that although multiple dies are shown for simplicity, a single die can perform multiple steps.

Figure 6:
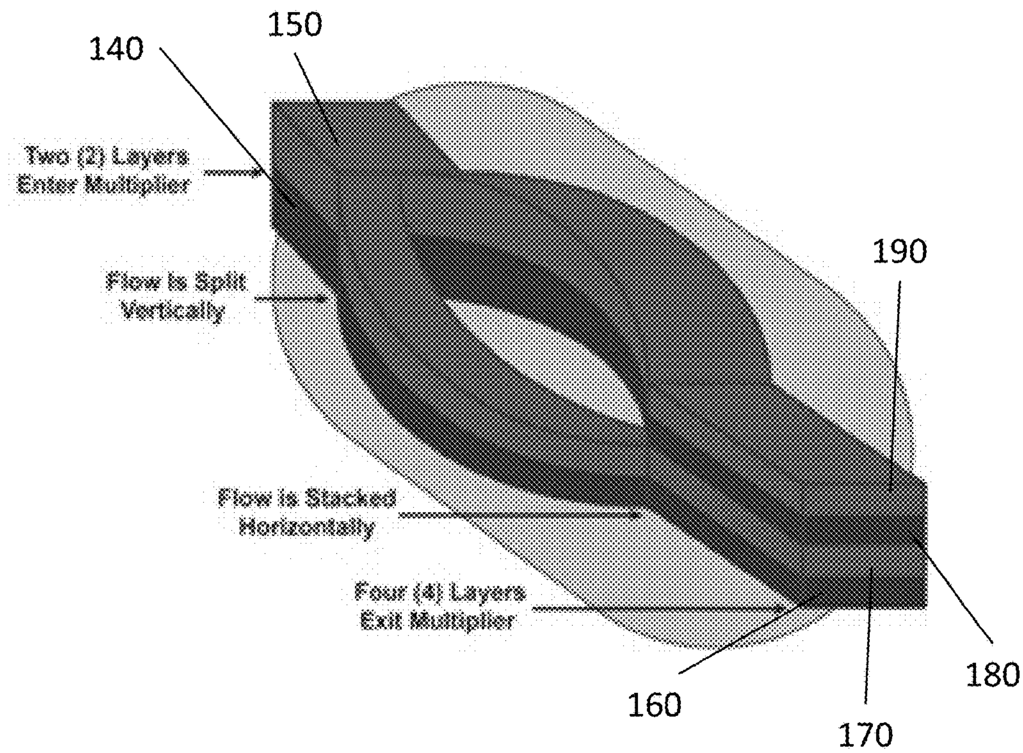
FIG. 6 schematically illustrates a component of the step in a multilayer coextrusion process.

FIG. 6 illustrates a "multiplier" process in detail. As illustrated, a two-layer composite 140, 150 enters the multiplier. As the flow progresses through the multiplier, the composite is split vertically. The flow continues and the vertically split composite is stacked one on top of the other, resulting in a four layer composite 160, 170, 180, 190 exiting the multiplier, where the layers alternate between matrix material and fiber material. It will be understood that such a process can result in fibers embedded in a matrix.

Figure 7:
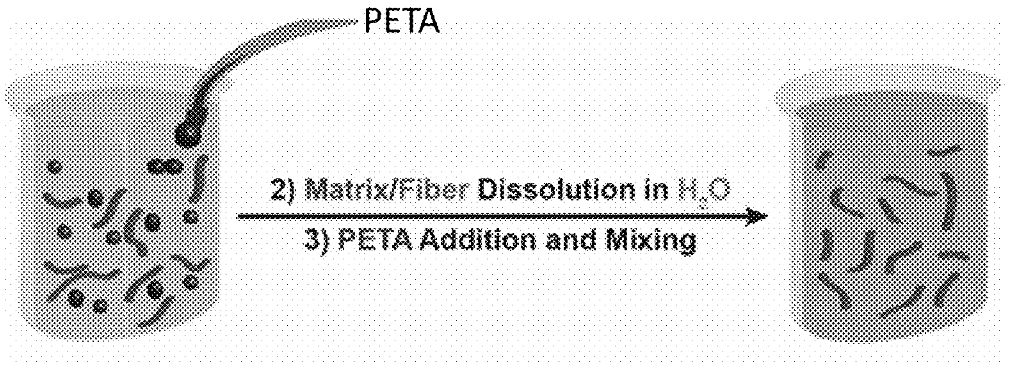
FIG. 7 schematically illustrates an additional steps in the formation of a fiber reinforced hydrogel.
Figure 8:
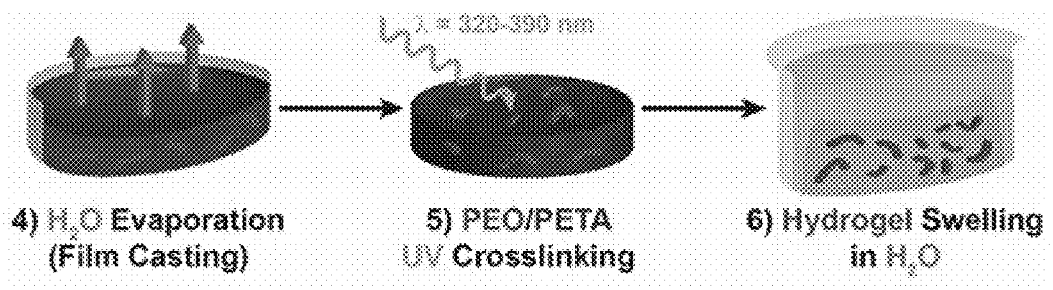
FIG. 8 schematically illustrates an additional steps in the formation of a fiber reinforced hydrogel.

Once the fiber reinforced hydrogel 40 is formed, it can undergo additional processing to achieve other forms of fiber reinforced hydrogels. FIGS. 7-8 illustrate additional process steps to achieve a functional fiber scaffold of PCL, PLA or PLLA. The reinforced hydrogel 40 can be dissolved in water with a pentaerythritol triacrylate (PETA) added to the solution and the solution can be mixed, as illustrated in FIG. 7. The PETA can act as a crosslinker. As illustrated in FIG. 8, through evaporation of the water and a film casing process, solution can be become a dried film. Once the film casting is complete, UV radiation of a wavelength between 320 and 390 nm can be applied to the dried film to achieve crosslinking. The resulting film can then be swollen with water to achieve the desired hydrogel reinforced with fibers.

The characteristics of the fiber reinforced hydrogels fabricated with the process illustrated in FIGS. 1-8 can be tuned by various process settings such as the rate at which each polymer is drawn through the extruder. Variations in this "pump rate" can vary both individual fiber size and fiber loading within the hydrogel architecture, which tunes the characteristics of the fiber reinforced hydrogel.

The coextruded fiber reinforced composites can range between near 0 and about 30% PCL by weight, resulting in a range of hydrogel fiber loadings ($v_f$) between near 0 and about 8% PCL fiber by volume. Fiber loading has been achieved as low as 0.1±0.02 vol %, thus, demonstrating the tunability of fiber loading over two orders of magnitude. The pump rate influences individual fiber size. The composite resulting from the multilayer coextrusion process contained thousands of individual fibers of infinite length (relatively speaking) surrounded by a PEO matrix formed by the continuous nature of the process illustrated in FIG. 1.

PCL/PEO, PLA/PEO, and PLLA/PEO composites can be fabricated at a coextrusion temperature of 190° C., exposing the hydrogel components to the same thermal history before post-processing. Typically, PCL functions as a soft elastomer at room temperature with a glass transition temperature ($T_g$) of −58° C. and a melting temperature ($T_{in}$) of 59° C., while PLLA served as a rigid reinforcing element at room temperature with a $T_g$ of 61 ° C. and a $T_m$ of 152 ° C. In one example, in order to make intermediate films, composites can be cut into strips approximately 5 mm in length prior to being dissolved in water and mixed with PETA crosslinker (as shown in FIGS. 7 and 8). The highly viscous nature of the solution can minimized fiber aggregation, which can provide for good distribution of the fibers in the solution.

Figure 9:
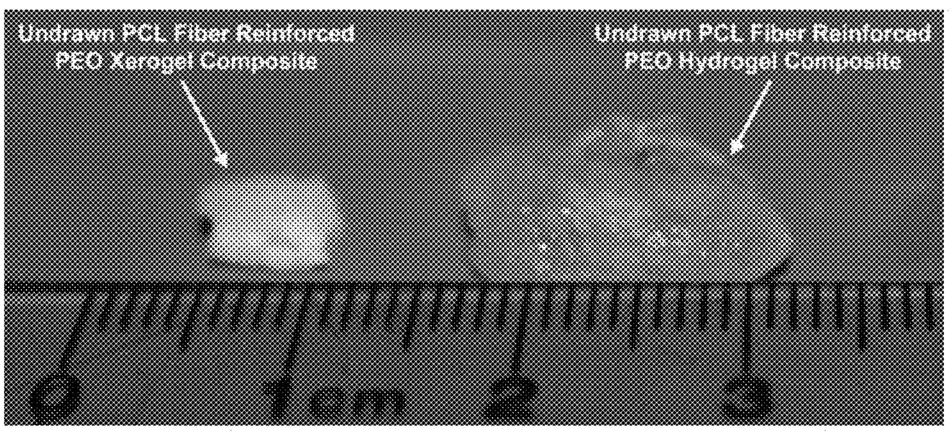
FIG. 9 is a photograph of a film composite and a fiber reinforced hydrogel.

During the step of crosslinking via UV radiation in hydrogel formation, a number of variables influence hydrogel architecture and mechanics including crosslinker functionality, radiation intensity, concentration ratios of crosslinker to matrix material such as PEO, and exposure time. An exemplary PETA crosslinker contains three (n=3) acrylate moieties activated with UV radiation (λ=320-390 nm). PETA may either react with other PETA molecules or abstract a hydrogen atom from the PEO backbone before radical coupling between PEO and PETA to crosslink PEO. Both of these reaction pathways typically occur. In some embodiments, with high gel fractions, the majority of the PEO chains undergo covalent crosslinking under sufficient rations of PEO:PETA (40-70 wt % PEO) and UV exposure times (20-120 minutes). By systematically varying the PEO:PETA concentration ratio and UV irradiation time, an appropriate balance of water uptake and crosslink density is achieved by using an approximately 60:40 (PEO:PETA by weight) ratio and 30 minutes UV irradiation. As illustrated in FIGS. 1, 7, and 8, the exemplary hydrogel fabrication process yielded a dried film as an intermediate, which is then swollen in distilled water to form the hydrogel. In one example, the dried film is swollen for 72 hours to form the hydrogel, as illustrated by the photograph in FIG. 9, which illustrates a dried composite (referred to as xerogel) on the left, and a swollen undrawn hydrogel on the right.

A random distribution of fibers can lead to efficient mechanical reinforcement in fiber reinforced hydrogels. The reinforcing effect of the hydrogels can be seem in many mechanical properties, including compressive mechanical stability and stiffness. Mechanical stability can be defined as the relative hysteresis ratio between the twentieth loading-unloading cycle and first loading-unloading cycle, as seen in FIG. 10-15. Stiffness can be determined by taking the linear derivative of the first loading curve and determining the slope of the derivative, which reflects both the degree of concavity of the loading curve and the maximum compressive stress.

Figure 10:
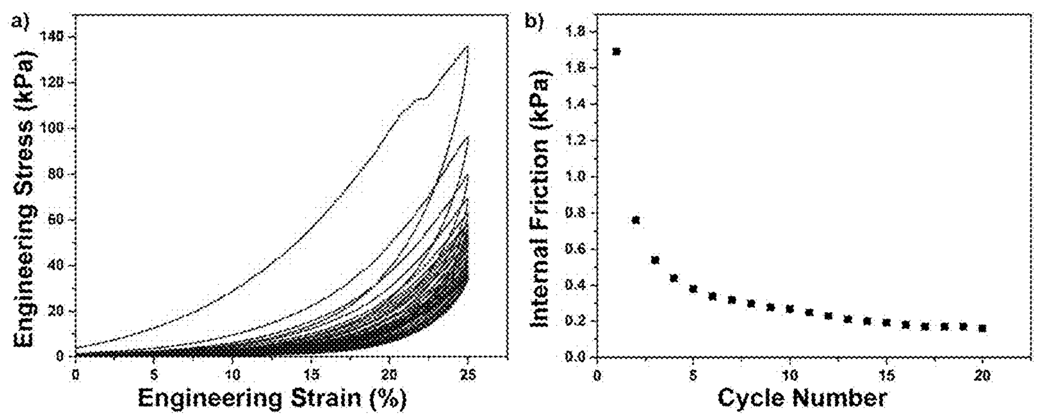
FIG. 10 depicts data regarding fiber reinforced hydrogel.
Figure 11:
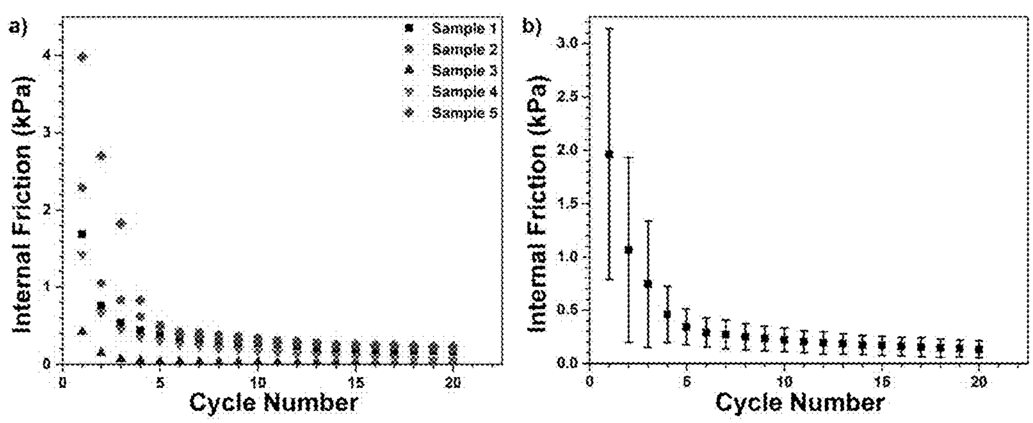
FIG. 11 depicts data regarding fiber reinforced hydrogel.
Figure 12:
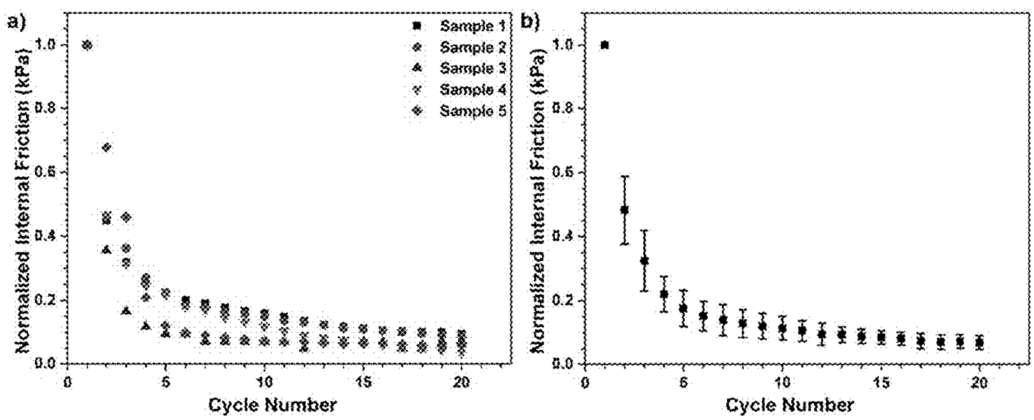
FIG. 12 depicts data regarding fiber reinforced hydrogel.
Figure 13:
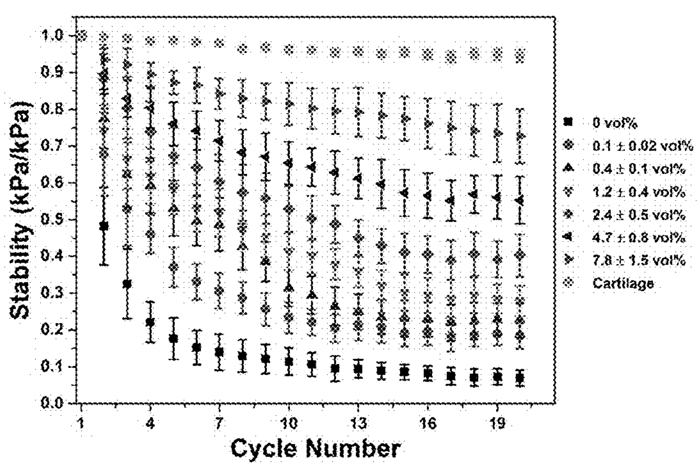
FIG. 13 depicts data regarding fiber reinforced hydrogel.
Figure 14:
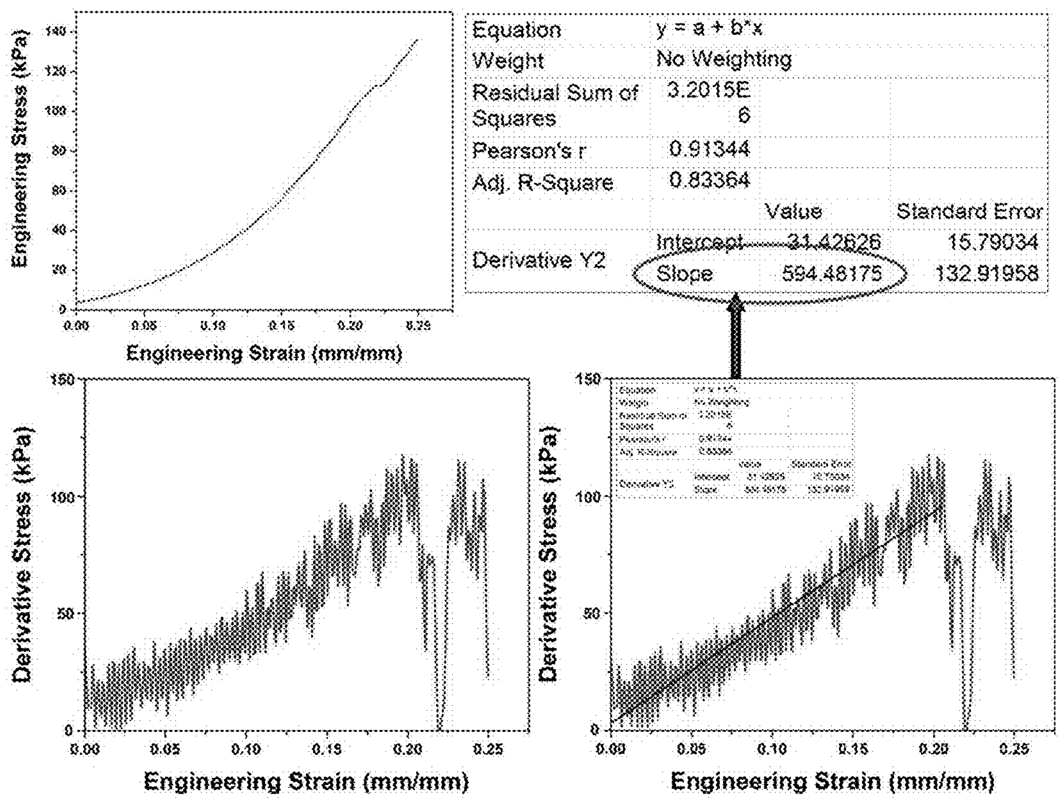
FIG. 14 depicts data regarding fiber reinforced hydrogel.
Figure 15:
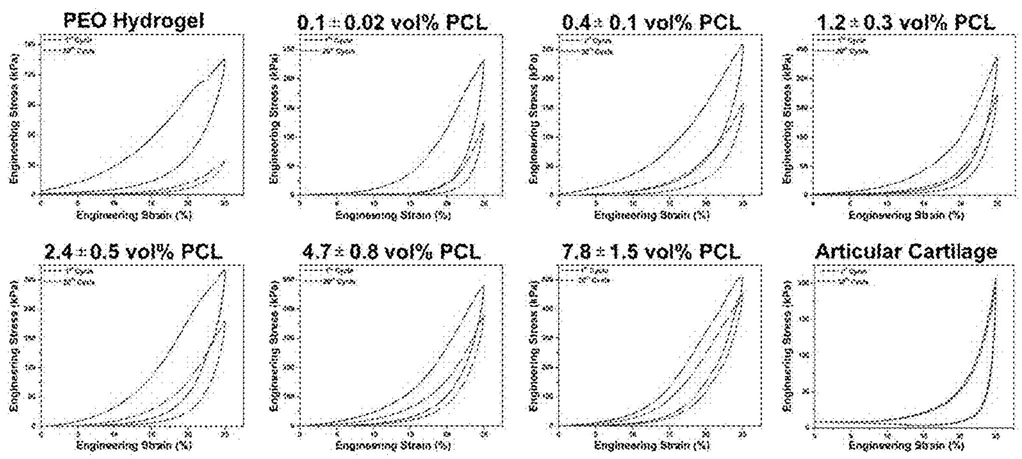
FIG. 15 depicts data regarding fiber reinforced hydrogel.

FIG. 10 illustrates: a) cyclic loading/unloading response to compressive strain; and b) $F_1$ plotted as a function of cycle number. FIG. 11 illustrates: a) $F_1$ plotted as a function of cycle number for five independent PEO hydrogel samples containing similar PCL fiber loading; and b) averaged $F_1$ values for the five independent samples. FIG. 12 illustrates: a) normalized $F_1$ values for each of the five independent PEO hydrogel samples; and b) averaged normalized $F_1$ values (stability) for the PEO hydrogel. FIG. 13 illustrates stability as a function of cycle number for PEO hydrogels of varying PCL fiber content and porcine articular cartilage, which can be used as a standard for hydrogel mechanics due to its similarity to adult human articular cartilage. FIG. 14 illustrates: sample calculation to determine the stiffness of a single hydrogel sample with a stiffness of 594 kPa using the slope of the linear derivative of the compressive loading curve. FIG. 15 illustrates the first and twentieth loading-unloading compressive hysteresis loops for the control PEO hydrogel which contains no fibers, varying fiber loading composition, and porcine articular cartilage.

For embodiments described herein, mechanical stability is significantly increased over a control hydrogel sample, even at low fiber loadings. Mechanical stability ratios increased from 18.5±3.5% ($v_f$~0.1 vol %), 22.7±4.6% ($v_f$~0.4 vol %), and 27.8±4.1% ($v_f$~1.2 vol %) to final mechanical stability ratio of 72.7±7.3% ($v_f$~7.8 vol %). PCL fiber-reinforced hydrogel stiffness as a function of PCL fiber loading shows good results. Articular cartilage, which is cited as a comparison, has a stiffness of 1.61±0.17 MPa. Hydrogel stiffness ranged from 0.69±0.04 MPa in the case of the control PEO hydrogel up to 1.94±0.21 IVIPa at ~8 vol % PCL fiber loading.

The coextruded composites containing PCL fibrous domains surrounded by PEO matrix were uniaxially drawn prior to the in situ hydrogel fabrication procedure. Due to the brittle nature of PEO, only composites containing the highest elastic PCL loading (~30.5 wt %) could be uniaxially drawn without immediate fracture. At this PCL content, these extruded composites could be extended to DR=6 reliably before failure. After uniaxial drawing, both PEO and PCL chains are oriented.

To explore the impact of composite drawing on hydrogel mechanics, drawn and undrawn fiber reinforced PEO hydrogels were fabricated from composites with similar PCL content. Hydrogels derived from drawn PCL/PEO composites at a similar loading possessed a gel fraction of 71.5±4.1% and an equilibrium swelling ratio of 2.9±1.1, which was comparable to the undrawn PCL/PEO hydrogels. This similarity in both gel fraction and water uptake suggested that the matrix gel structure was similar between hydrogels derived from both undrawn and drawn PCL/PEO composites, allowing isolation of the effect of chain alignment in the reinforcing fiber elements.

After isolating the effect of fiber modulus, compression analysis revealed similar mechanical stability between hydrogels containing undrawn (72.7±7.3) and drawn (73.1±8.2) PCL fibers. However, $K_c$ increased significantly to 6.31±0.18 MPa with the increase in fiber modulus. A high degree of synergistic reinforcement between the drawn PCL fibers and the PEO hydrogel was achieved. Not only was cooperative reinforcement behavior observed under static compressive loading, but also during dynamic small amplitude oscillatory shear (SAOS) deformation. Over four orders of magnitude in frequency, the PEO hydrogels with no fibers, undrawn PCL fibers, and drawn PCL fibers all exhibit gel-like behavior. By incorporating undrawn PCL fibers, the plateau storage modulus (G') increased ~56% from 2.5±0.2 MPa to 3.9±0.3 MPa. Strikingly, uniaxial drawing before hydrogel fabrication increased G' to 12.3±1.2 MPa, which is an increase of 390% compared to the control PEO hydrogel and 215% compared to the undrawn PCL fiber reinforced PEO hydrogel.

The modular nature of the multilayer coextrusion process allowed processing of a PLLA/PEO composite to obtain a PLLA fiber reinforced PEO hydrogel with $v_f$=7.5±1.6 vol %, similar to that of undrawn (highest loading) and drawn PCL fiber reinforced PEO hydrogels. Rectangular PLLA fibers with dimensions 2.3±0.5 μm (width) and 1.5±0.4 μm (thickness) were isolated from coextruded composites at >99 wt % purity for mechanical testing. Tensile analysis revealed a fiber modulus of 167±24 MPa for the undrawn PLLA fibers, which was attributed to the $T_g$ of PLLA instead of preferential chain alignment in coextruded PLLA/PEO composites or delaminated PLLA fiber mats. A value of $f_H$=0.03 was determined for the coextruded PLLA fibers.

PEO hydrogels reinforced with undrawn PLLA fibers exhibited similar water uptake (3.0±0.7 g H2O/g Gel) and gel fraction (68.6±5.2%) compared to reinforcement with undrawn PCL fibers, allowing isolation of the type of fibrous phase material on gel mechanics.

When compared with PEO hydrogels reinforced with undrawn PCL fibers the stiffness of PLLA fiber reinforced hydrogels increased 350%. The mechanical stability of PLLA fiber hydrogels also increased to 80.4±5.4%. In addition, the dynamic SAOS shear modulus increased to 27.4±1.4 MPa representing an increase of 600% over the PEO hydrogel reinforced with undrawn PCL fibers at similar $v_f$. The ability to tailor hydrogel stiffness and shear modulus over an entire order of magnitude simply by tuning processing parameters and material selection presents an incredibly unique avenue to achieve targeted stem cell differentiation as the rigidity of the environment that cells are exposed to has been shown to influence cell differentiation pathways.

Three-dimensional hydrogel scaffolds provide an inclusive cellular growth environment with pathways for nutrient influx and waste efflux. Fiber reinforced hydrogels were evaluated as a 3D tissue culture model using NIH 3T3 murine fibroblast cells, a common in vitro model for connective tissue. Murine fibroblast cells were injected into the interior volume of each hydrogel system and incubated for 72 hours. Following 72 hours incubation, cells were first stained with ActinGreen488 to visualize the cytoskeleton and DAPI (blue) to visualize the nuclei or adhered fibroblast cells. Confocal microscopy imaging showed fibroblast cell growth in the control PEO hydrogel. However, the ActinGreen488 stain revealed a random, loosely connected cytoskeleton morphology. The increased mechanical strength of the fiber reinforced PEO hydrogels provide physical support to the injected cells, which in turn provided a modest enhancement in actin stress fiber development. Having demonstrated the viability of in situ fiber reinforced PEO hydrogels as tissue engineering scaffolds, there is also the possibility to utilize the tunable mechanical nature of these hydrogels to direct cell differentiation.

The multilayer coextrusion technology disclosed herein provide for the fabrication of fiber/matrix composites such as PCL/PEO and PLLA/PEO. A straightforward crosslinking strategy can be used to fabricate either PCL or PLLA fiber reinforced PEO hydrogels. Exfoliated rectangular fibers with lateral dimensions below 10 μm were shown to be well-distributed and randomly aligned throughout the PEO hydrogel matrix, resulting in synergistic reinforcement between the individual fibers and the gel matrix. By varying both fiber loading and fiber type, hydrogel stiffness was tailored between 0.69±0.04 MPa and 8.76±0.21 MPa, while storage modulus was tailored between 2.5±0.2 MPa and 27.4±1.4 MPa. These fiber reinforced PEO hydrogels fabricated via the in situ method displayed excellent fibroblast cellular proliferation and adhesion, demonstrating their viability as tissue engineering scaffolds. The ability to fabricate distributed, sub-micron scale fiber-reinforced synthetic, biocompatible hydrogels which enhanced cell adhesion and proliferation in a tunable, scalable process presents a powerful technological tool for the cell scaffolding and tissue growth communities.

Figure 16:
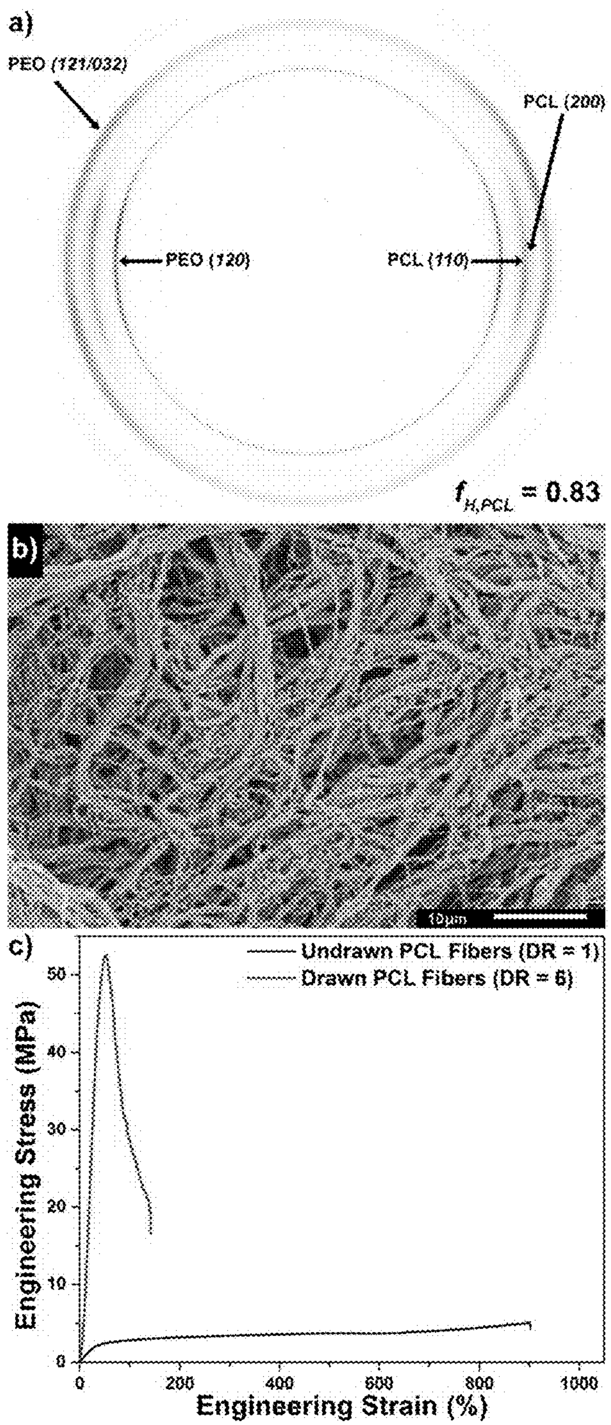
FIG. 16 depicts structure and data regarding fiber reinforced hydrogel.
Figure 17:
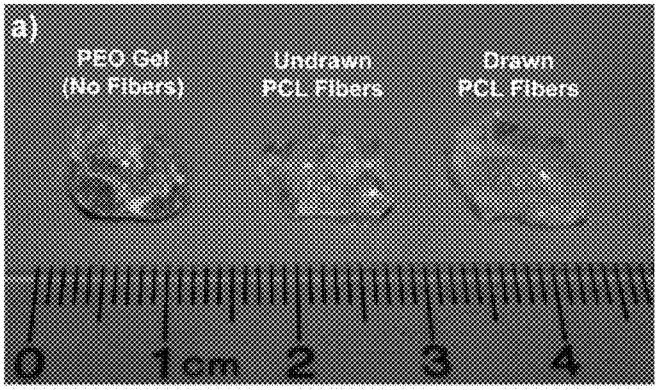
FIG. 17 is a photograph of hydrogel.
Figure 18:
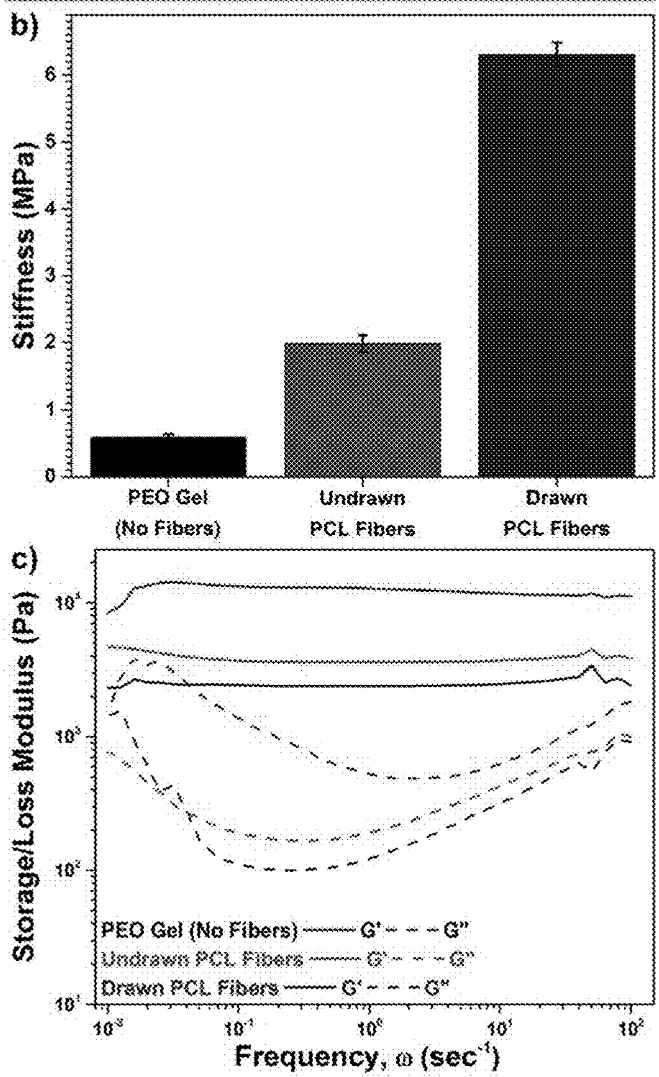
FIG. 18 depicts data regarding fiber reinforced hydrogel.
Figure 19:
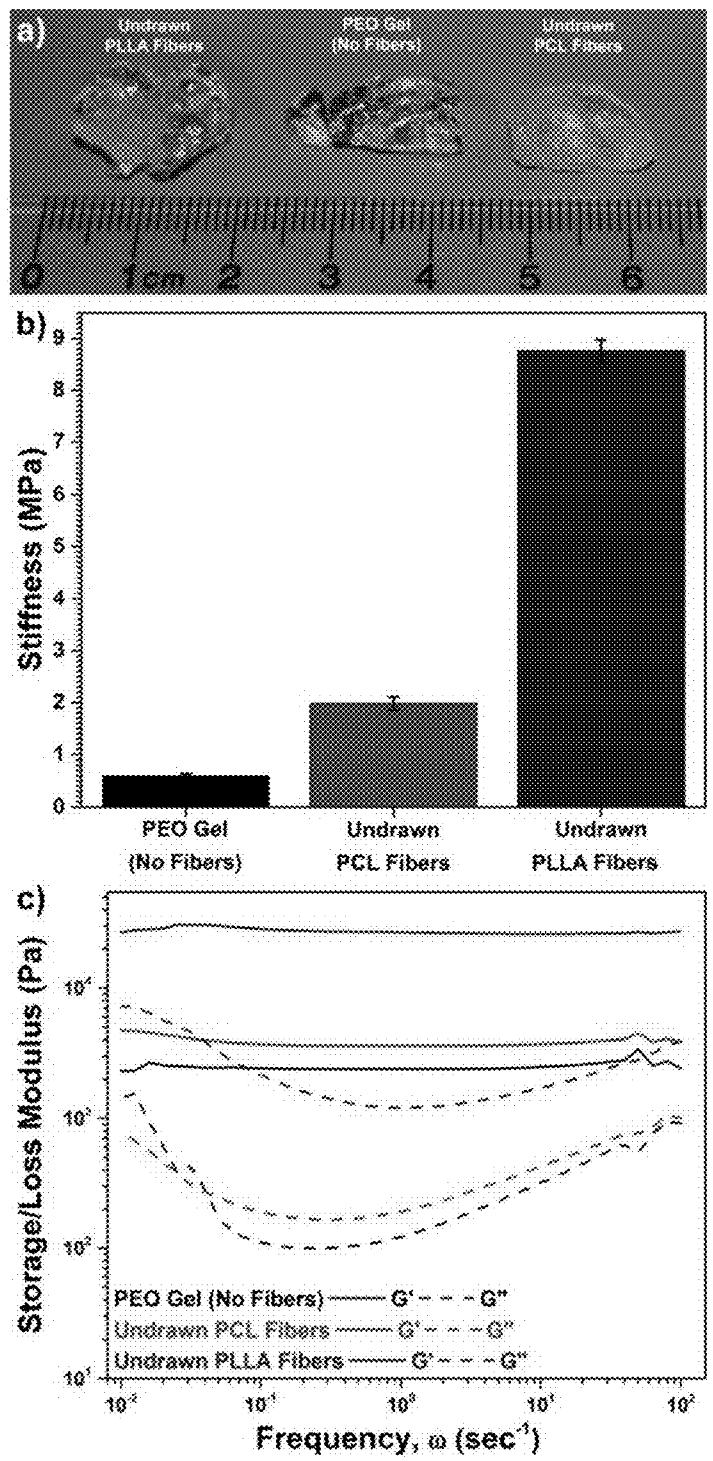
FIG. 19 depicts structure and data regarding fiber reinforced hydrogel.
Figure 20:
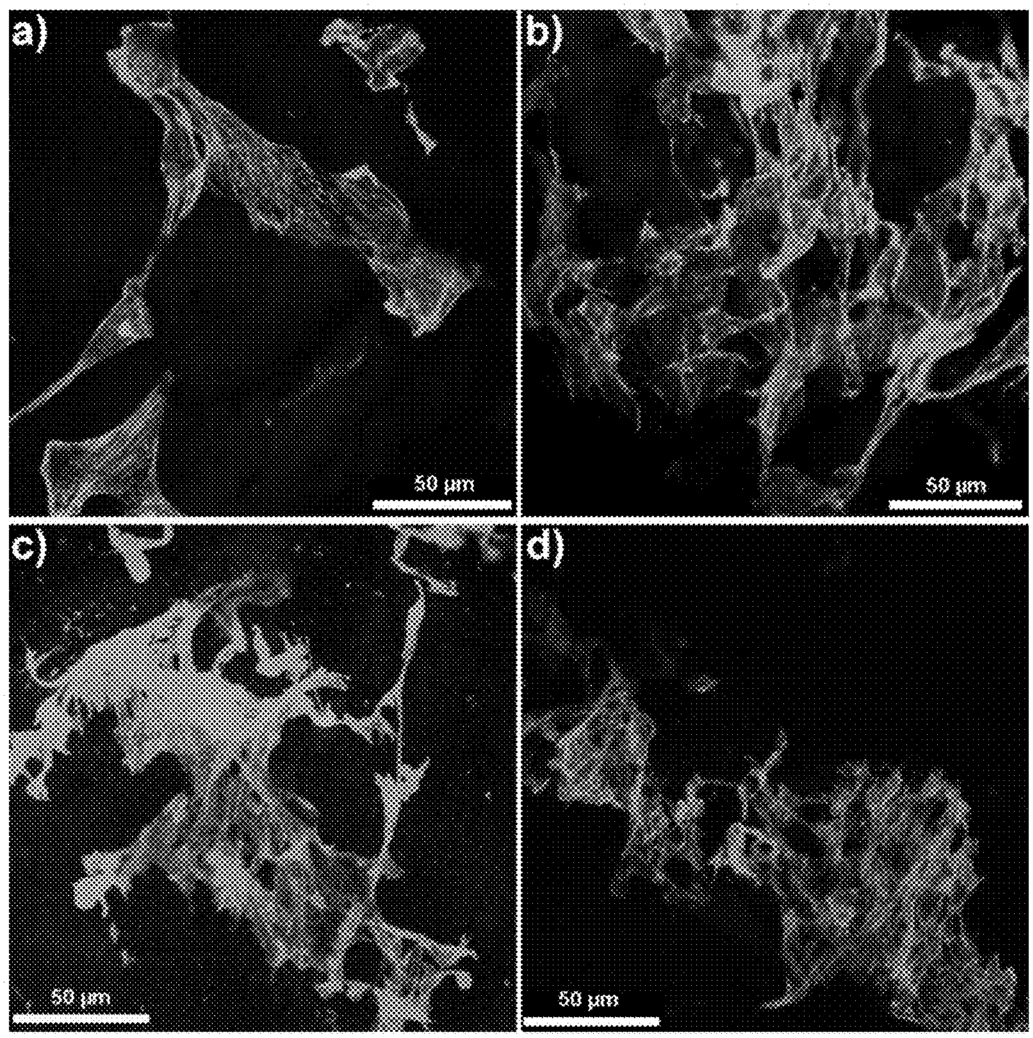
FIG. 20 depicts images of structure of fiber reinforced hydrogels.
Figure 21:
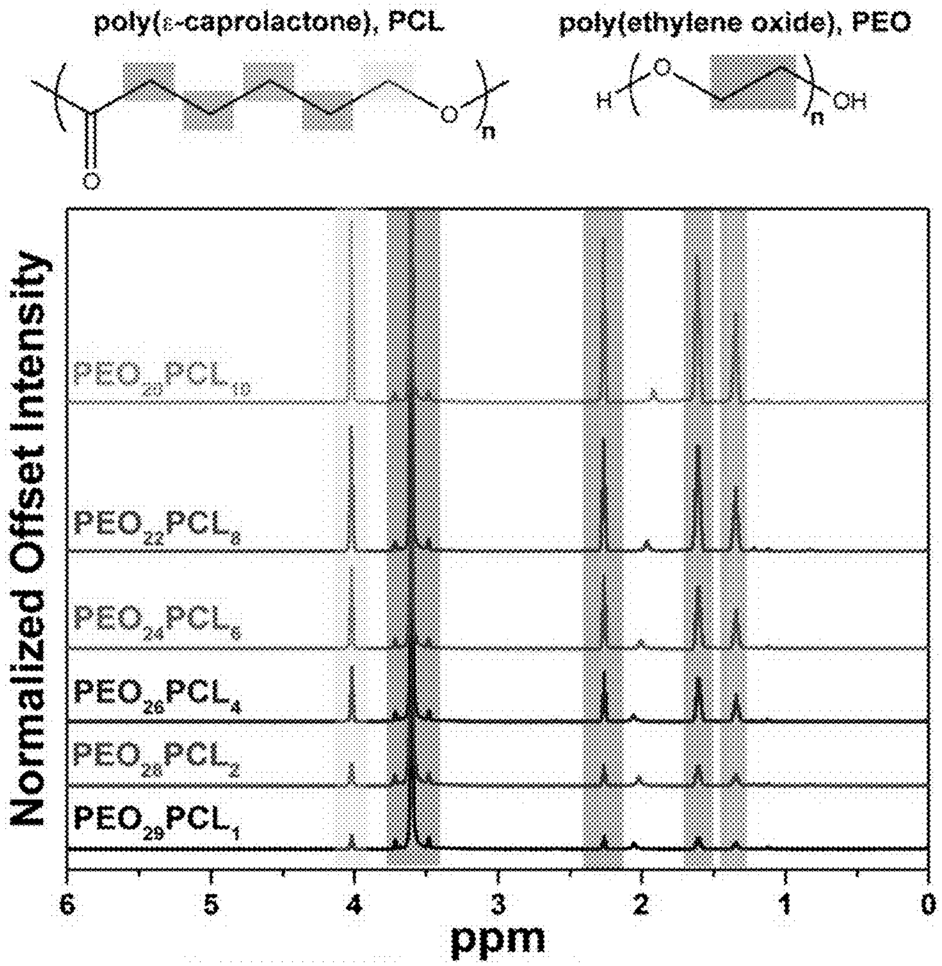
FIG. 21 depicts data regarding fiber reinforced hydrogel.
Figure 22:
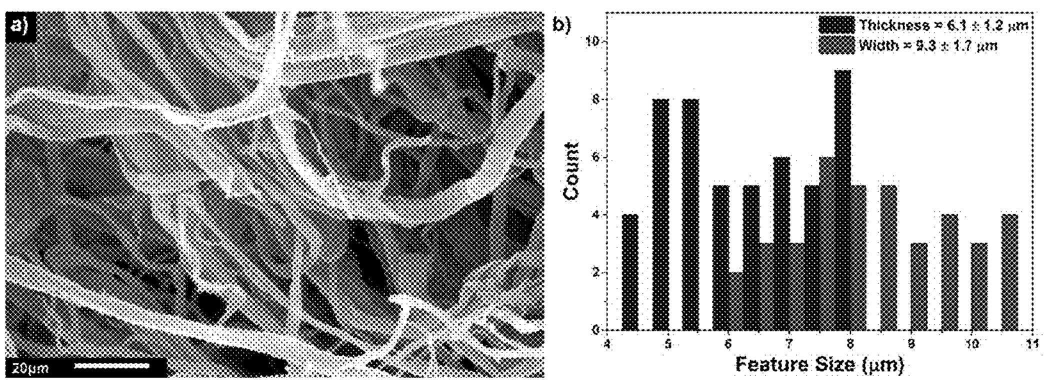
FIG. 22 is a photograph of a fiber reinforced hydrogel and depicts data regarding fiber reinforced hydrogel.
Figure 23:
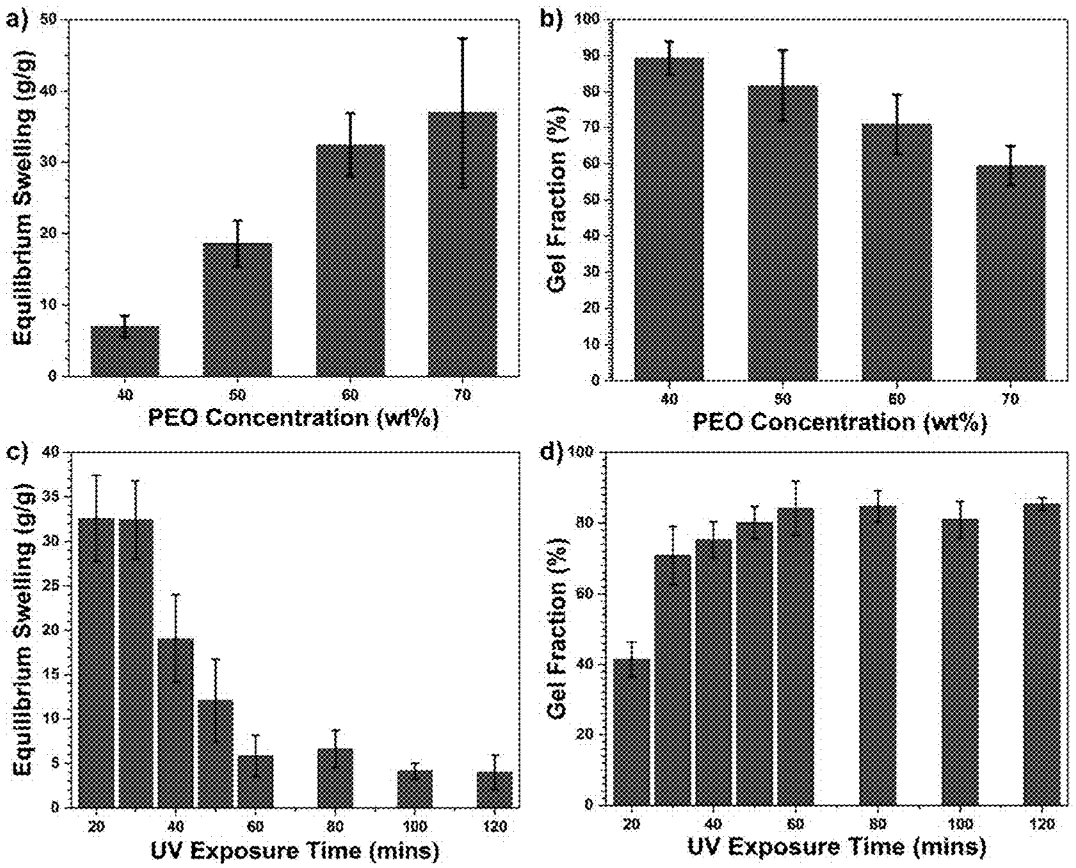
FIG. 23 depicts data regarding fiber reinforced hydrogel.

A number of additional figures are provided as part of this disclosure. FIG. 16 illustrates: a) 2D WAXS profile revealed a high degree of PCL chain orientation following composite drawing; b) SEM micrograph highlighting fiber integrity after composite drawing and solvation/hydroentanglement; and c) tensile response to uniaxial deformation of drawn and undrawn PCL fibers. FIG. 17 illustrates: a) Optical images of the control PEO hydrogel containing no fibers, PEO hydrogel containing 7.8±1.5 vol % undrawn PCL fibers, and PEO hydrogel containing 7.2±1.3 vol % drawn PCL fibers; b) stiffness of the three hydrogel samples determined from uniaxial compression; and c) dynamic small amplitude oscillatory shear sweeps of the three hydrogel samples. FIG. 18 is a photograph of the control PEO hydrogel containing no fibers, PEO hydrogel containing 7.8±1.5 vol % undrawn PCL fibers, and PEO hydrogel containing 7.5±1.6 vol % undrawn PLLA fibers. FIG. 19 illustrates: b) stiffness of the three hydrogel samples determined from uniaxial compression; and c) dynamic SAOS sweeps of the three hydrogel samples. FIG. 20 illustrates fibroblast cell adhesion and proliferation in PEO hydrogel containing: a) no fibers; b) undrawn PCL fibers; c) drawn PCL fibers; and d) undrawn PLLA fibers: the cytoskeleton is stained with ActinGreen488 and the cell nuclei are stained with DAPI (blue). FIG. 21 illustrates comparison between weight fractions of PCL in the coextruded PCL/PEO composites at various feed rates calculated using relative PCL/PEO melt pump rates and analytically determined via $^1$H NMR. FIG. 22 illustrates: a) SEM micrograph; and b) lateral fiber size distribution of PCL fibers isolated for coextruded PCL/PEO composites using highest relative PCL:PEO feed rate. FIG. 23 illustrates: a) Equilibrium swelling ratio, b) gel fraction of PEO/PETA crosslinking as a function of reactant concentration (30 min crosslinking time); and c) equilibrium swelling ratio and d) gel fraction of PEO/PETA crosslinking as a function of UV exposure time (60/40 PEO/PETA weight ratio).

Here, we demonstrate a ~60% and ~55% increase in overall hydrogel stiffness and stability using this in situ fabrication strategy compared to traditional electrospun PCL fiber-reinforced PEO hydrogels. The modular nature of the in situ fabrication process allowed for a substantial range of hydrogel stiffness and shear storage modulus, demonstrating preferential cell differentiation. The potential for high-throughput, tailorable hydrogel tissue engineering platforms which can impact cellular differentiation has enormous transformative potential in the growing field of regenerative medicine.

As noted, the scaffolds described herein can be used for controlling the differentiation of stem cells, which an then differentiate along many cell lines. Requirements for successful implementation of tissue engineering scaffolds include porosity for nutrient influx and waste efflux, degradation under physiological conditions, and biocompatibility.

For Fiber-matrix composites and systems made with a multilayer coextrusion process, the fabricated systems can contain rectangular PCL fiber-like domains with an approximate lateral size distribution of 2.6±0.6 μm by 1.6±0.4 μm loaded into a PEO matrix at approximately 3% by weight. The aspect ratio (length:lateral dimension) can be tuned by the cutting length of the composite and can be infinitely large due to the method of continuous fabrication. The lateral fiber size, fiber loading, and fiber material within the PEO matrix can be controlled by the varying coextrusion process parameters such as, for example, pump rate, multiplier configuration, and die geometry. Furthermore, an uniaxial drawing method can be used to tune the semi-crystalline microstructure within the fiber-like domains, in turn tuning the thermo-mechanical properties of the fiber-like domains within the composite. Thus, resulting in a facile, tunable method for producing fiber-like domains aligned within a PEO matrix. Such a PEO matrix can be left in place as a composite, washed away to yield fibers, or modified to yield a hydrogel. Similar fiber reinforced hydrogel systems fabricated via dissimilar techniques can be used for tissue engineering, regenerative medicine, diagnostics, cellular immobilization, and pharmaceutical delivery.

Crosslinking can be achieved with processes such as solvent-free, electron beam radiation and γ-radiation from a $C^{60}$ source. Radiation exposure results in PEO chain-scission and subsequent chain recombination in a crosslinked structure. This crosslinked structure can then be swelled with water and the water-soluble solid phase is extracted, leaving PCL fibers embedded in a crosslinked PEO hydrogel. Additional hydrogel fabrication method uses supramolecular chemistry to form physical crosslinks between PEO chains.

By mixing an aqueous solution of PEO and cyclodextrin, a self-assembled supramolecular gel is formed. Use of covalent chemistry to form chemical crosslinks in PEO can also be effective. Under relatively mild conditions, PEO can be chemically crosslinked using PETA through UV-induced initiation forming a swellable PEO hydrogel while leaving the embedded PCL fibers intact. Use of thermally induced peroxide mediated crosslinking requires a fiber material that is generally stable at elevated temperatures, such as PLA. An aqueous solution of PEO containing solid PLA fibers may be mixed with a solution of acetone and peroxide, heated, and the radicals formed from thermal cleavage of the peroxide form chemical crosslinks with the aqueous PEO phase, forming a gel phase reinforced with PLA fibers.

Figure 24:
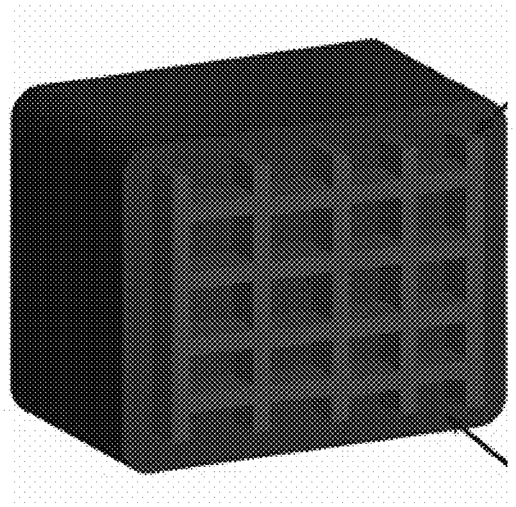
FIG. 24 is a schematic illustration of a fiber reinforced hydrogel with a three-dimensional printed network.
Figure 25:
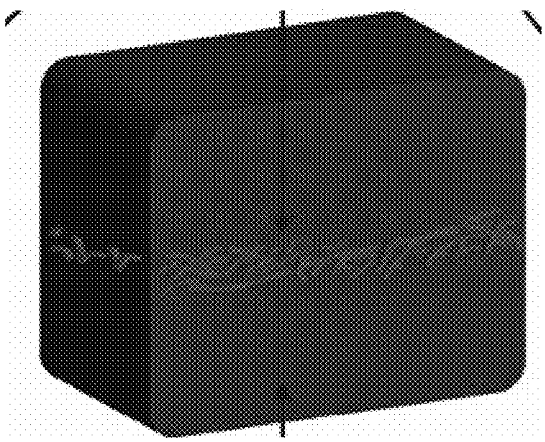
FIG. 25 is a schematic illustration of a fiber reinforced hydrogel with fibrous electrospun mats.
Figure 26:
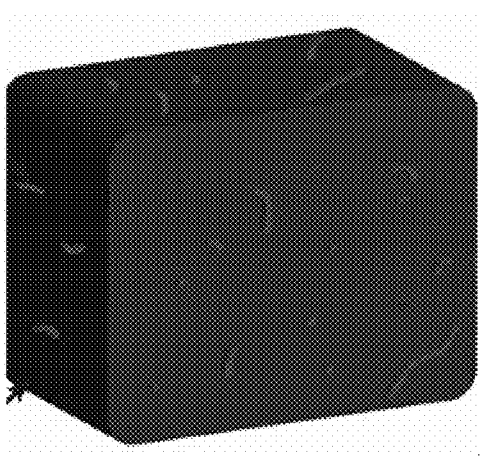
FIG. 26 is a schematic illustration of a fiber reinforced hydrogel fabricated using multilayers coextrusion.
Figure 27:
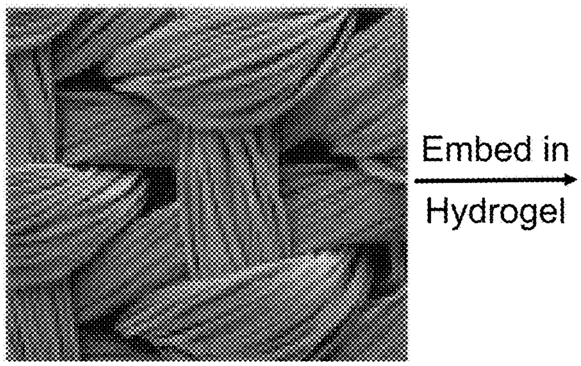
FIG. 27 is a photograph of a woven fiber reinforcement material.
Figure 28:
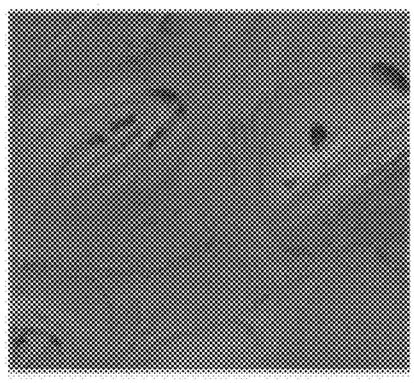
FIG. 28 is a photograph of the woven fiber reinforcement material embedded in a hydrogel.

FIGS. 24-28 schematically illustrate various additional fiber reinforced hydrogels that are crosslinked swellable matrices. FIG. 24 illustrates a hydrogel with a three-dimensional printed network. FIG. 25 illustrates a hydrogel with fibrous electrospun mats. FIG. 26 illustrates a hydrogel fabricated using a multilayer coextrusion process. FIG. 27 is a photograph of a woven fiber reinforcement material, and FIG. 28 is a photograph of that woven fiber reinforcement material embedded in a hydrogel. The fibers of the woven fiber reinforcement material are on a nano-scale. However, when embedding into a hydrogel, the fibers are not dispersed throughout the matrix.

Figure 29:
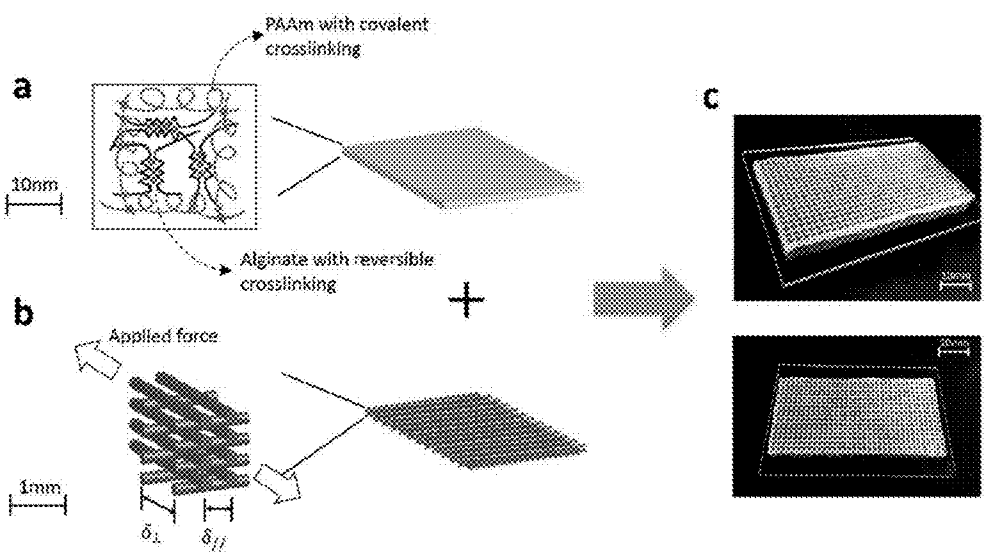
FIG. 29 schematically illustrates a three-dimensional printed network.

FIG. 29 schematically illustrates a three-dimensional printed network. The network includes PAAm with covalent crosslinking and alginate with reversible crosslinking. Such three-dimensional printed networks are interconnected so that the reinforcement of the fibers is three-dimensional. However, the feature size is typically larger than 25 μm.

Figure 30:
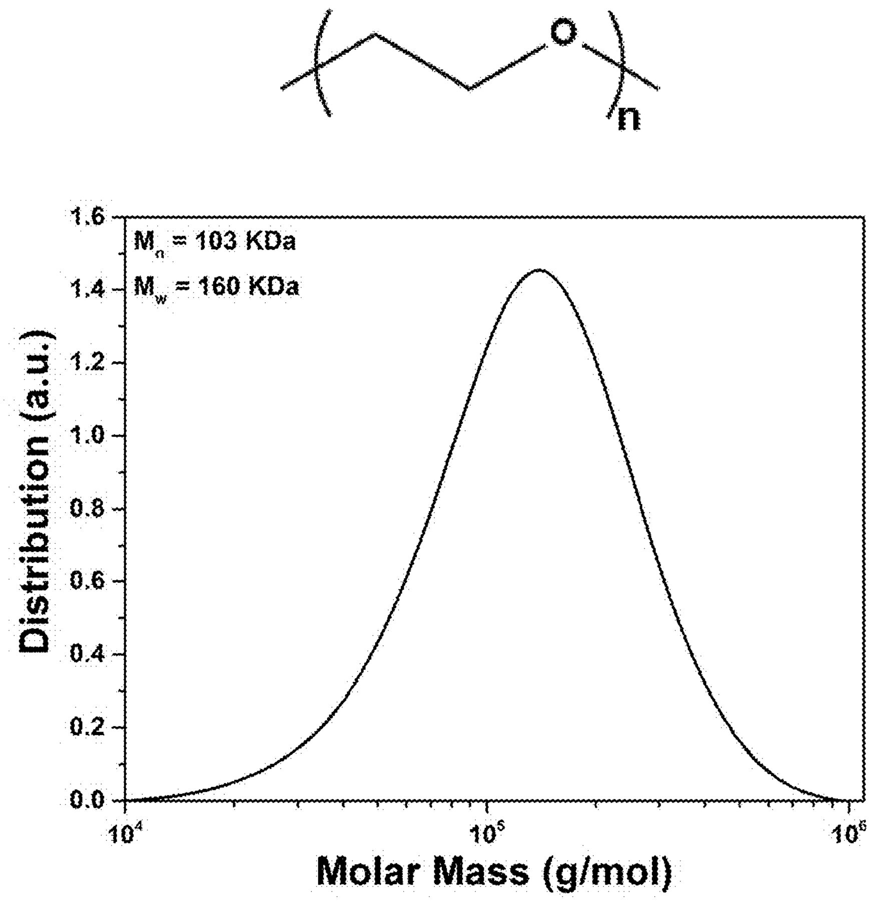
FIG. 30 illustrates polyethylene oxide.
Figure 31:
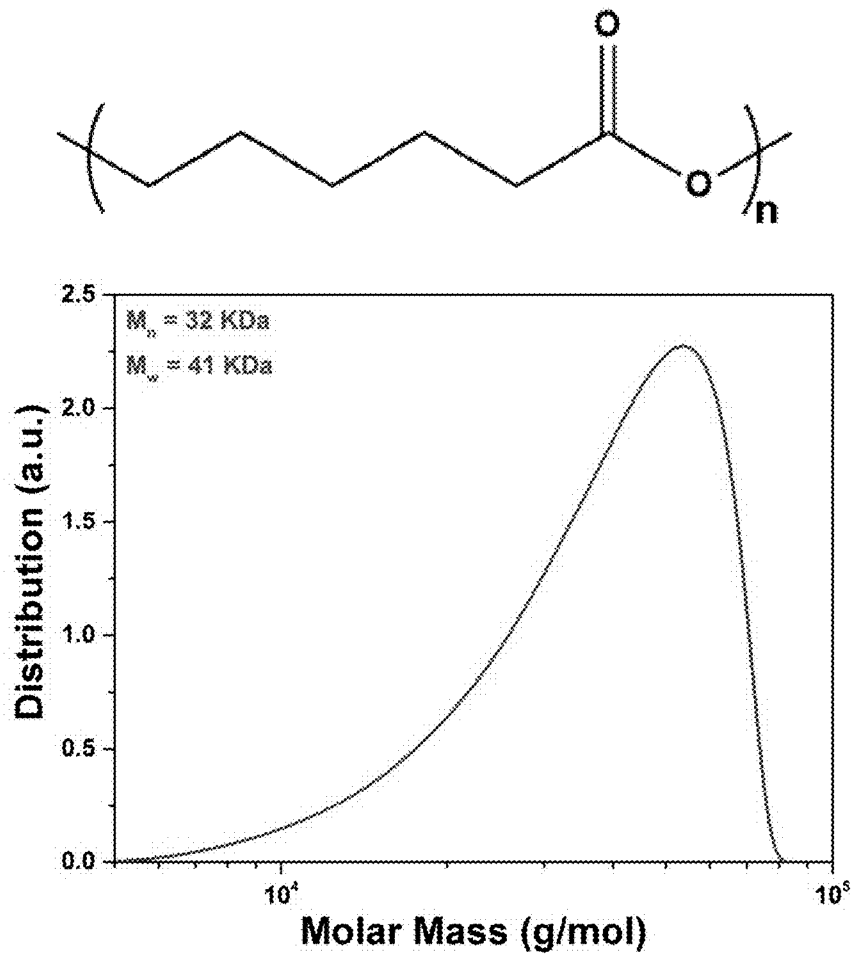
FIG. 31 illustrates poly(ε-caprolactone).

FIGS. 30 and 31 illustrate materials used for fiber reinforced hydrogels fabricated using a multilayer coextrusion process. FIG. 30 illustrates PEO. PEO can be a blend of PolyOx WSR N:10 and PolyOx WSR N:80 manufactured by Dow Chemical Company. FIG. 30 further illustrates the molecular mass distribution of PEO. FIG. 31 illustrates a PCL. The PCL can be a product marketed as CAPA 6800. FIG. 5 further illustrates the molecular mass distribution of PCL. Other materials such as PLA can be used as well.

Figure 32:
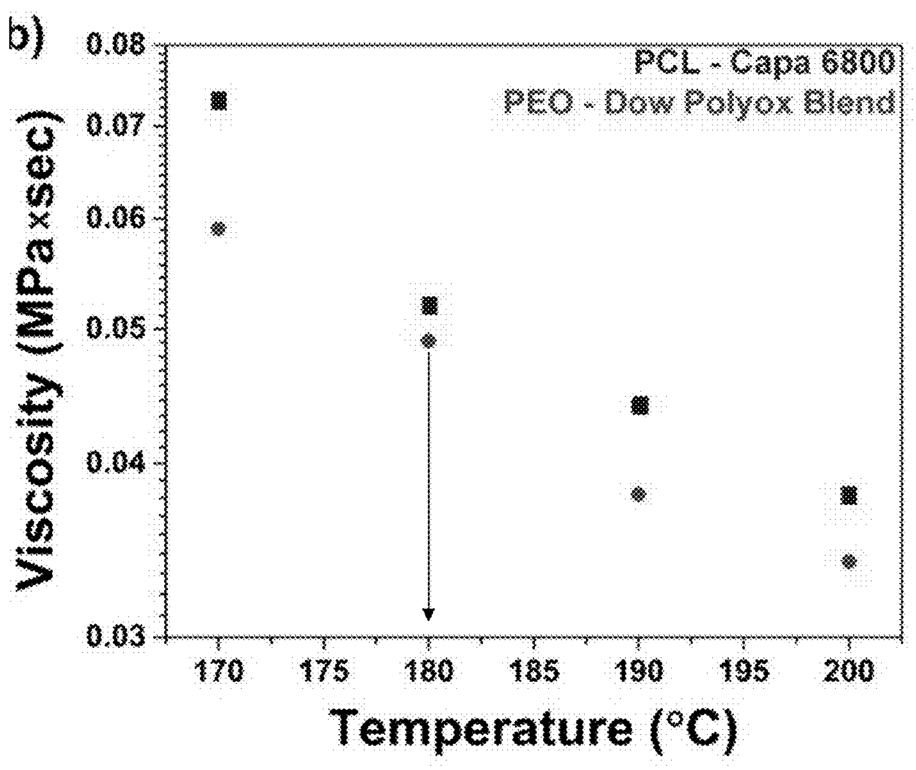
FIG. 32 is a graph depicting the relationship between the viscosity of the PEO/PCL and temperature.

With regard to materials, the composition of PEO and PCL at a ration or 90 PEO/10 PCL, with a 67% PEO skin layer has proven to be a bio-approved material. See also FIG. 32 for a graph depicting the relationship between the viscosity of the PEO/PCL and temperature.

Figure 33:
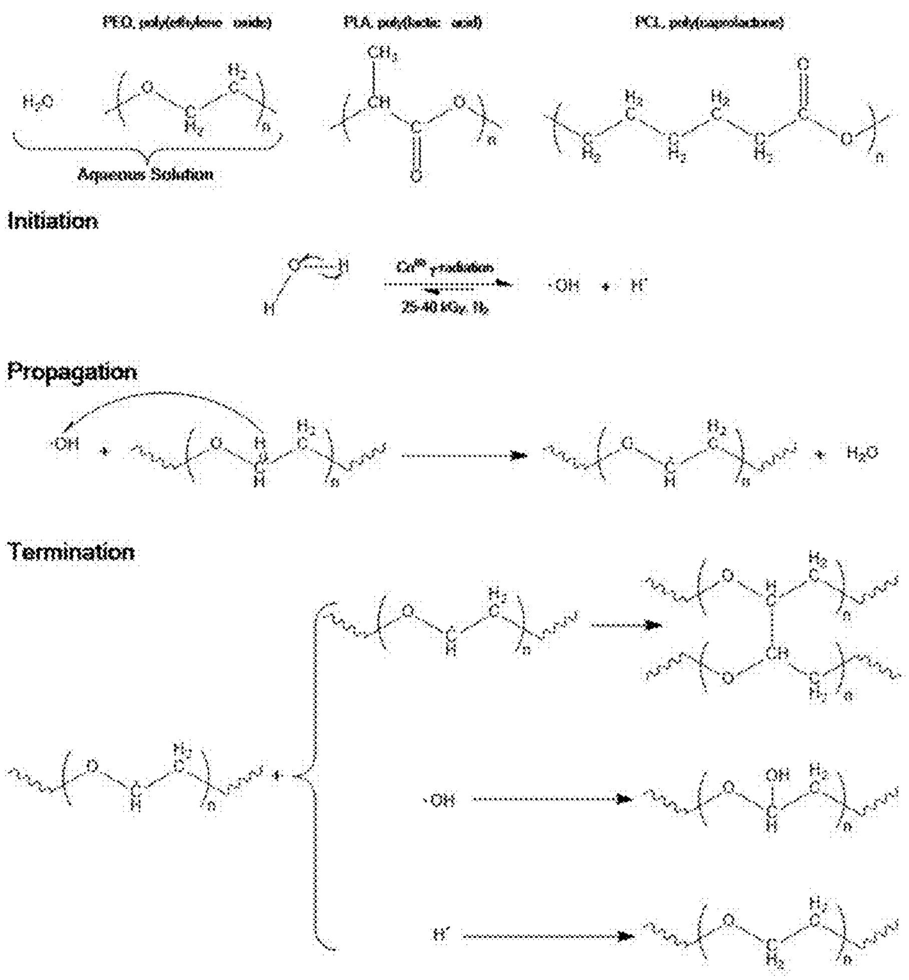
FIG. 33 illustrates $Co^{60}$ γ-radiation crosslinking.
Figure 34:
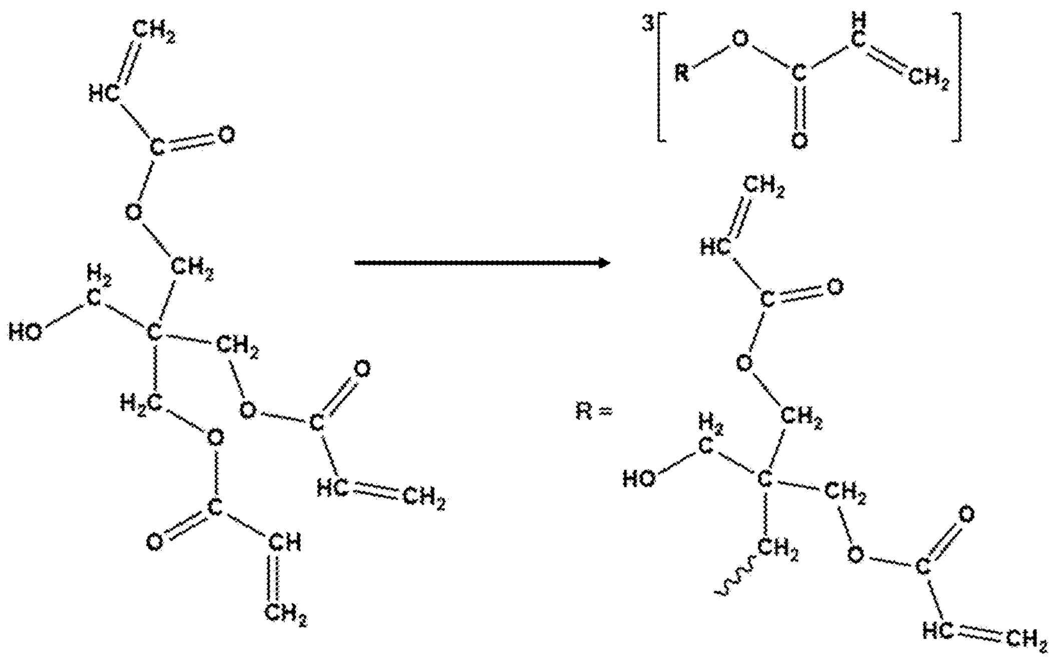
FIG. 34 illustrates UV crosslinking.
Figure 35:
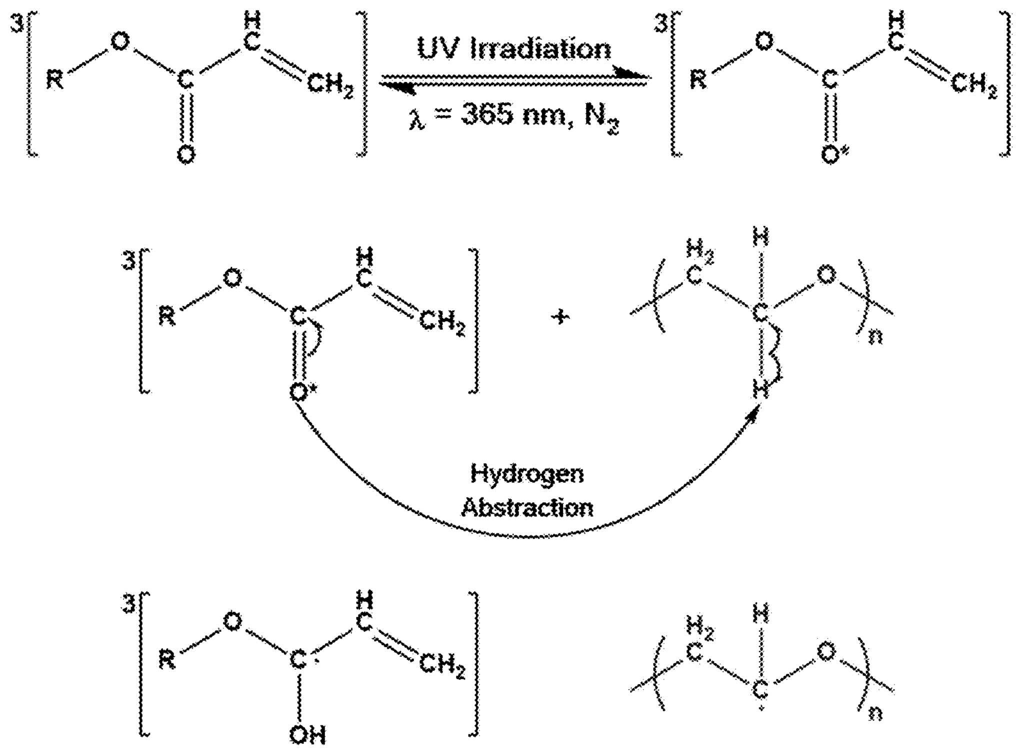
FIG. 35 illustrates UV crosslinking.
Figure 36:
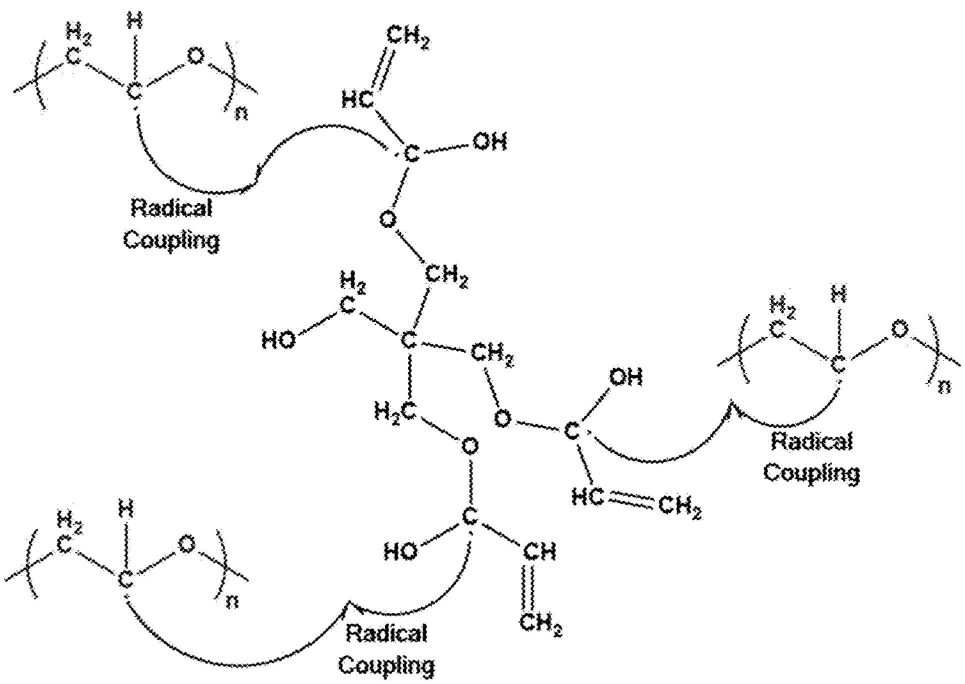
FIG. 36 illustrates UV crosslinking.

As noted herein, crosslinking can be achieved through a number of methods. FIG. 33 illustrates $Co^{60}$ γ-radiation crosslinking. The process begins with an aqueous solution of PEO, along with poly(lactic acid) and PCL. FIG. 33 further illustrates initiated with $Co^{60}$ γ-radiation, propagation, and termination. FIGS. 34-36 illustrate UV crosslinking. As shown in FIG. 34, pentaerythritol triacrylate (PETA) contains 3 ketone moieties. Ketones transition to an excited triplet state when exposed to radiation in the UV spectrum. FIG. 35 illustrates UV irradiation at a wavelength of 365 nm, resulting in hydrogen absorption. FIG. 36 illustrates radical coupling.

FIGS. 37 and 38 illustrate the structure of covalent crosslinking. Each PETA molecule can covalently bond with 3 PEO chains, as illustrated in FIG. 37. The level of the reaction can be evaluated by using Gel Permeation Chromatography (GPC). Molecular weight of PEO should increase significantly when covalent crosslinks are formed.

The following protocol was used to evaluate covalent crosslinking. First, dissolve 61.8 mg PEO/PCL composite in 1.14 ml distilled water, where the PEO/PCL composite contains 3 wt % PCL, i.e., 1.8 mg (0.016 mmol) PCL+60 mg (1.362 mmol) PEO. This results in 10 wt % PEO in distilled water (0.063 mmol). The solutions is agitated overnight to dissolve PEO and disperse PCL fibers. Six milligrams (0.020 mmol) of pentaerythritol triacrylate (PETA) is added. The solutions is agitated for 1 hour to disperse PETA in solution. A film is cast and left under covered tin-foil box for 2 days. The film is dried under vacuum at room temperature for 1 day. The film is then UV crosslinking at 365 nm wavelength for 2 hours. The results are a covalently crosslinked xerogel film swell-able in water. Table 1 below displays results for five samples. Each sample was weighted when initially dry ($W_1$), after swelling in water for 72 hours ($W_2$), and after drying under vacuum for 12 hours at 40° C. The equilibrium swelling ration (ES) and gel fraction (GF) were also measured, where:

TABLE 1

$$ES = \frac{W_2 - W_3}{W_3} \qquad GF = \frac{W_3}{W_1} \times 100\%$$

| Sample | $W_1$ (mg) | $W_2$ (mg) | $W_3$ (mg) | ES | GF |
|---|---|---|---|---|---|
| 1 | 21.9 | 62.4 | 13.9 | 3.49 | 63.5 |
| 2 | 15.6 | 56.2 | 8.7 | 5.46 | 55.8 |
| 3 | 21.8 | 95.3 | 16.2 | 4.88 | 74.3 |
| 4 | 17.6 | 47.9 | 9.4 | 4.10 | 53.4 |
| 5 | 20.4 | 69.3 | 11.7 | 4.92 | 57.4 |

For this sample set, ES=4.6±0.7, and GF−60.9%±7.5%.

Figure 39:
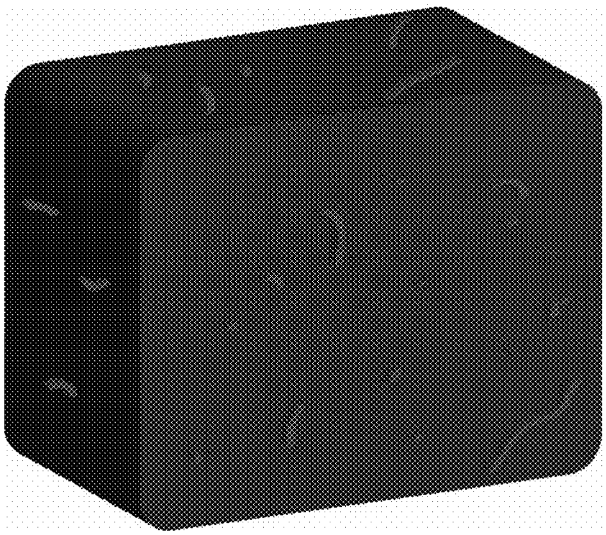
FIG. 39 schematically illustrates the structure of a fiber reinforced hydrogel.
Figure 40:
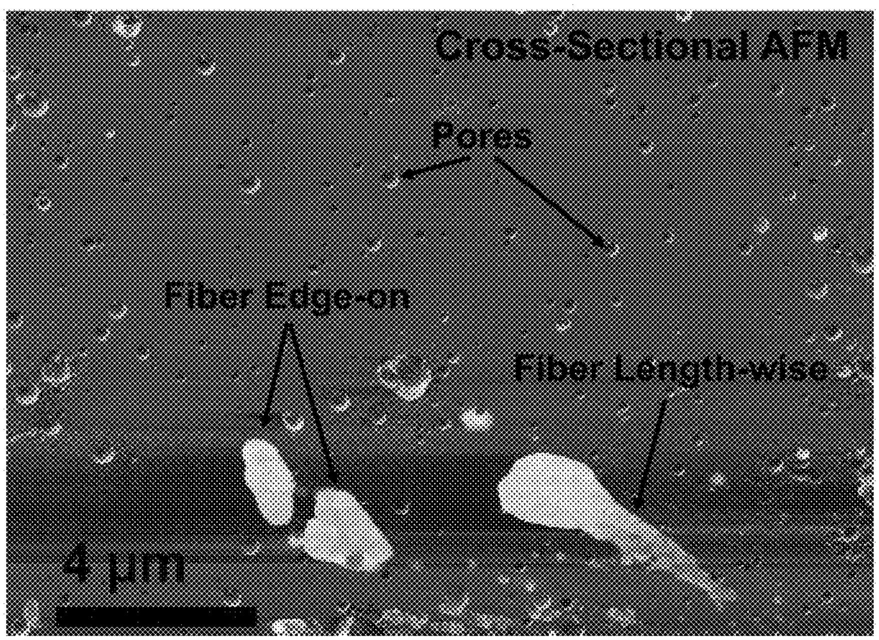
FIG. 40 depicts a fiber reinforced hydrogel.
Figure 41:
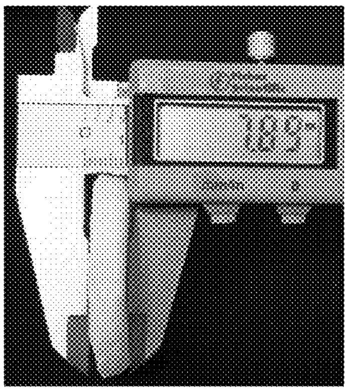
FIG. 41 illustrate an exemplary measurement of the thickness of a fiber reinforced hydrogel.
Figure 42:
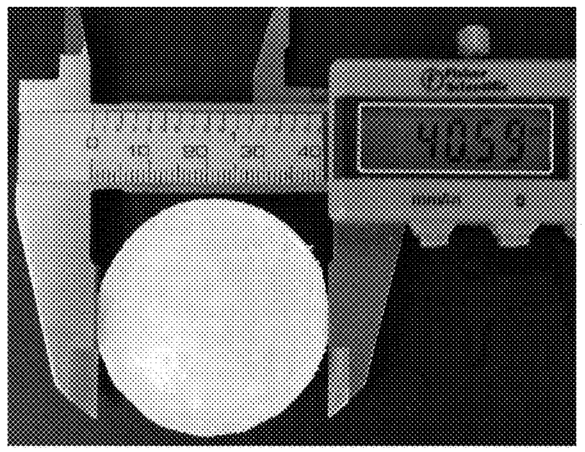
FIG. 42 illustrate an exemplary measurement of the diameter of a fiber reinforced hydrogel.
Figure 43:
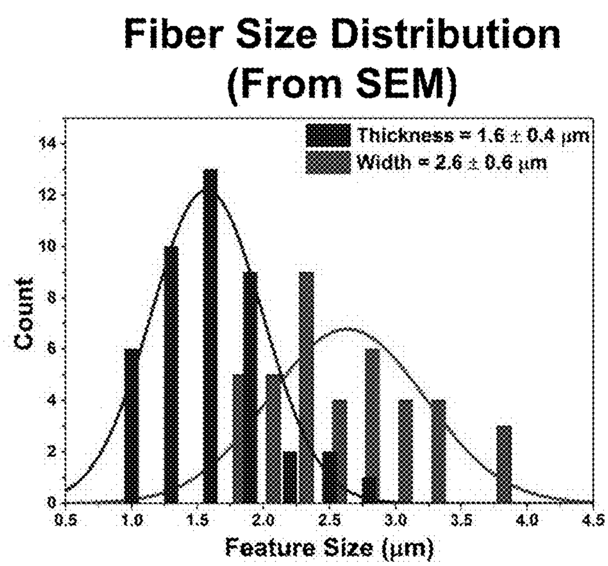
FIG. 43 is a chart depicting the distribution of fiber thickness and width as determined by SEM.
Figure 44:
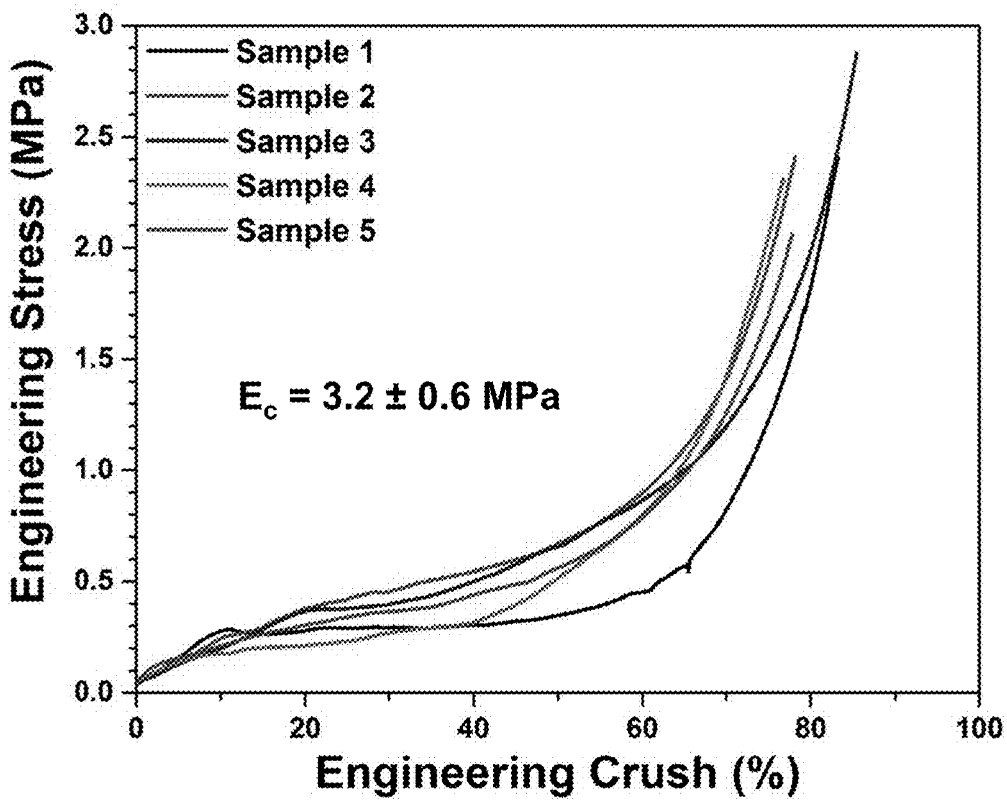
FIG. 44 is a chart depicting the mechanical properties of fiber reinforced hydrogels, showing engineering stress in MPa charted against engineering crush as a percentage.

FIG. 39 schematically illustrates the structure of a fiber reinforced hydrogel. FIG. 40 depicts a fiber reinforced hydrogel, showing pores, lengthwise fibers and edge-on fibers. FIGS. 41 and 42 illustrate exemplary measurements of the thickness and diameter of a fiber reinforced hydrogel. FIG. 43 is a chart depicting the distribution of fiber thickness and width as determined by SEM. FIG. 44 is a chart depicting the mechanical properties of the five samples, showing engineering stress in MPa charted against engineering crush as a percentage.

Figure 45:
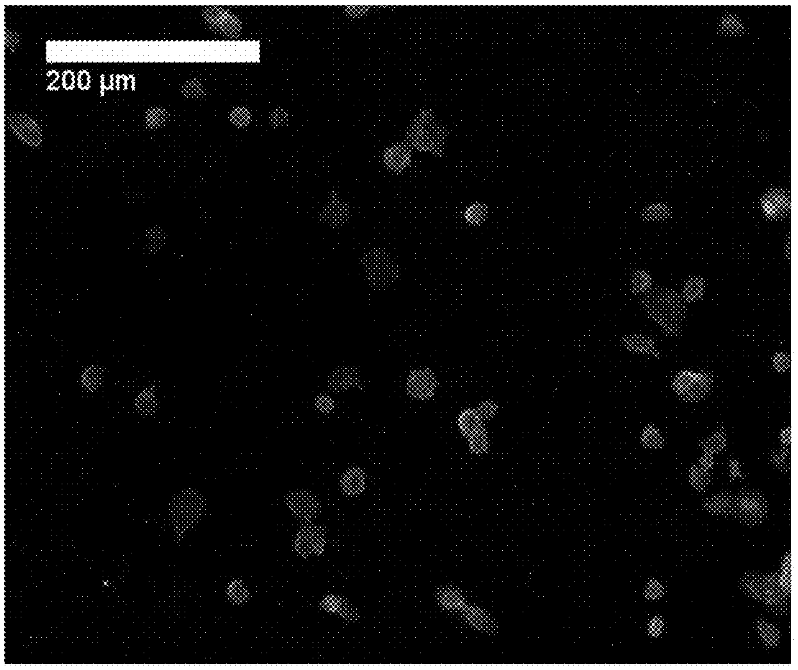
FIGS. 45 illustrates a PEO fiber-reinforced hydrogels seeded with NIH3T3 Fibroblast cells after 24 hours.
Figure 46:
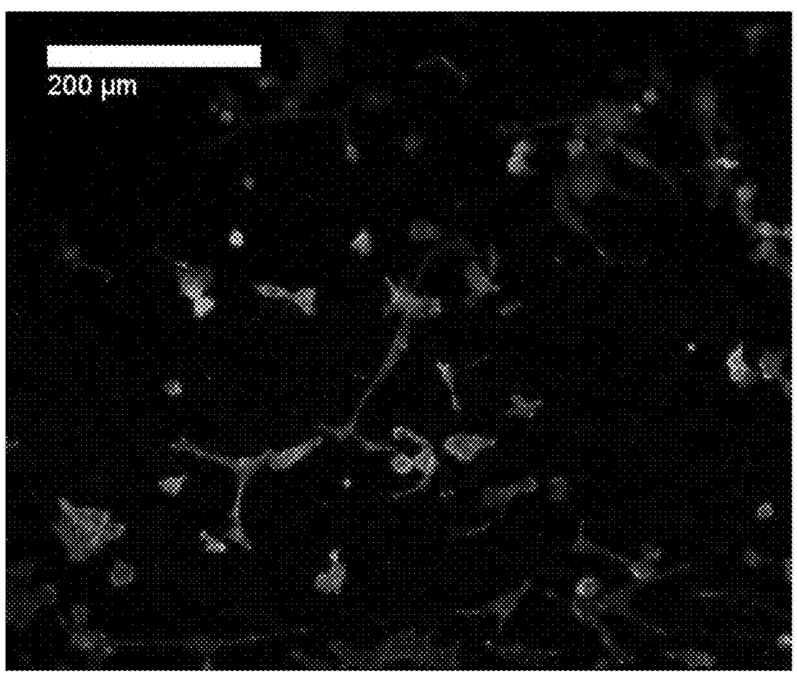
FIGS. 46 illustrates a PEO fiber-reinforced hydrogels seeded with NIH3T3 Fibroblast cells after 72 hours.

As illustrated by FIGS. 45 and 46, fiber-reinforced hydrogels fabricated via multilayer coextrusion are viable tissue engineering cell scaffolds. FIGS. 45 and 46 depict PCL fiber reinforced PEO hydrogels seeded with NIH3T3 Fibroblast cells. FIG. 45 is after 24 hours, and FIG. 46 is after 72 hours. As is shown, cells adhered and grew along the hydrogel surface.

Figure 47:
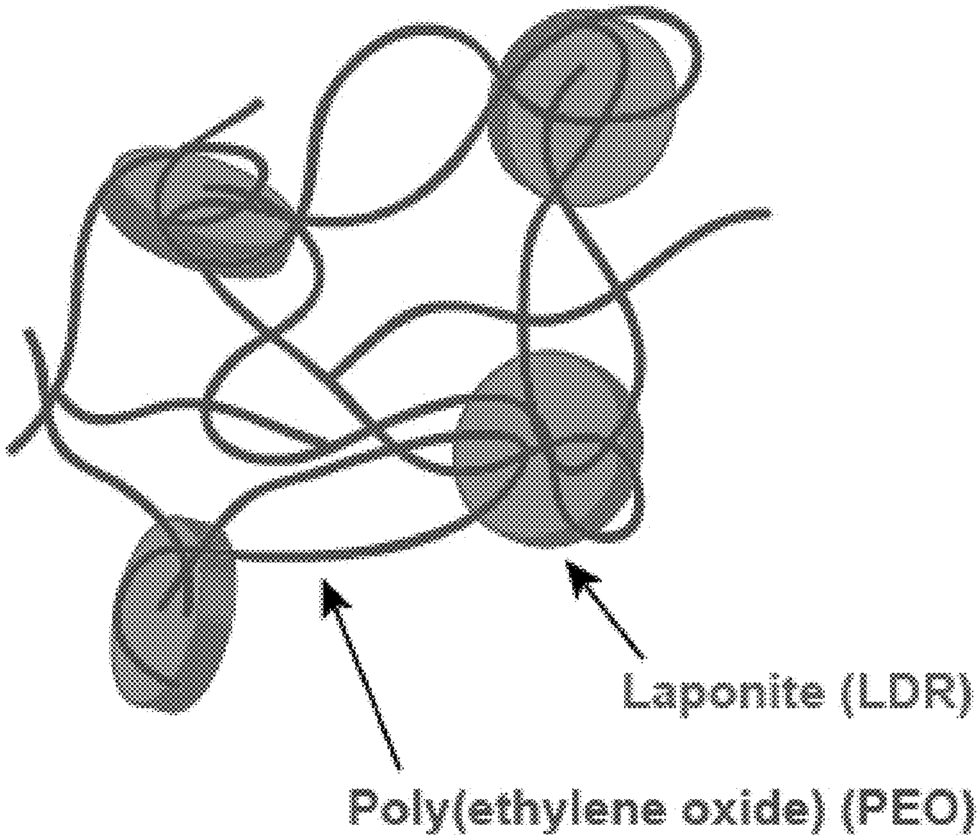
FIG. 47 depicts non-covalent crosslinking of PEO.
Figure 48:
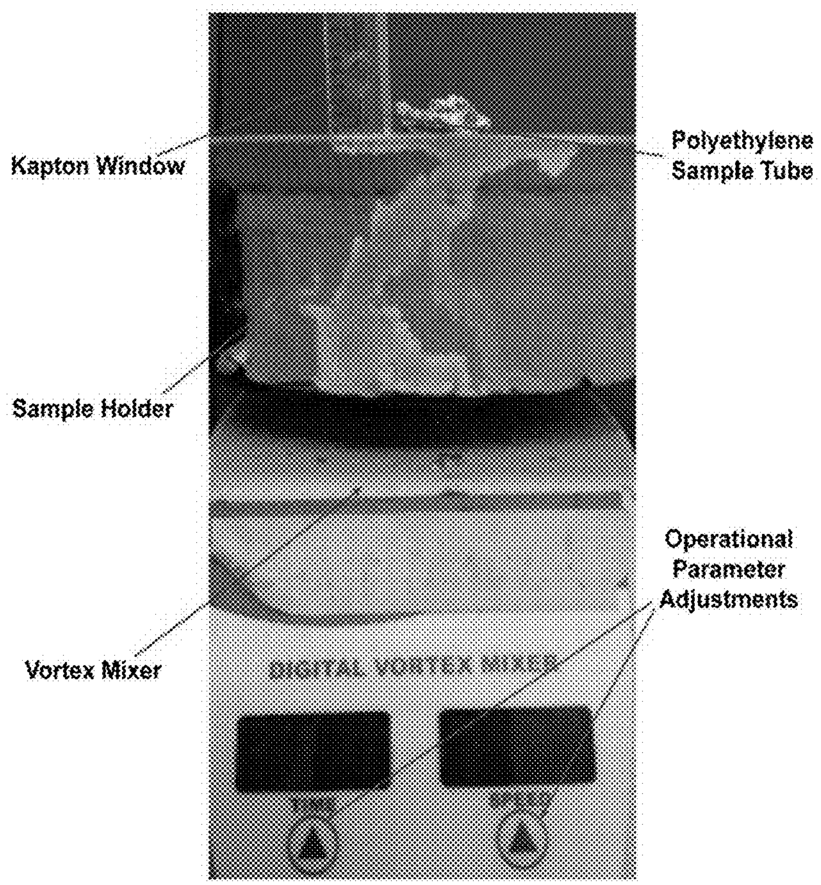
FIG. 48 depicts equipment for preparing non-covalent crosslinked PEO.
Figure 49:
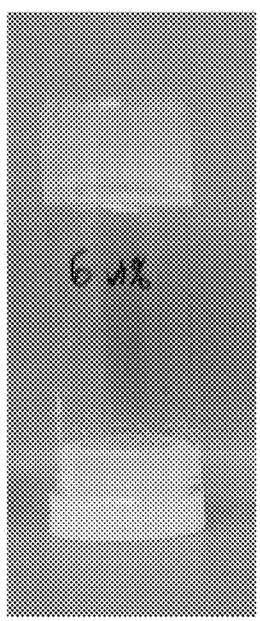
FIG. 49 depicts a vile of 6 wt % gel with 60:40 (PEO: Laponite).
Figure 50:
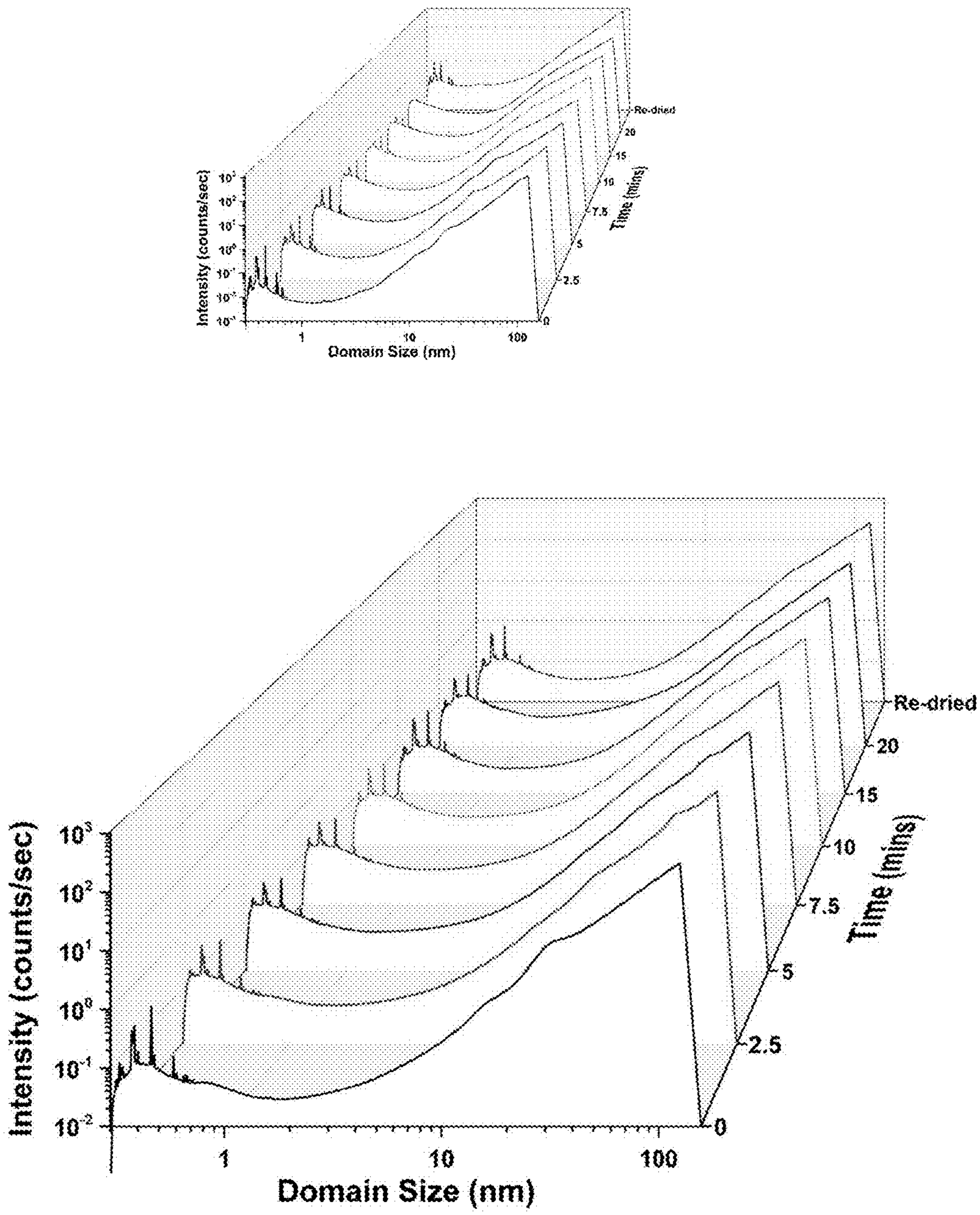
FIG. 50 depicts properties of covalent crosslinked PEO.
Figure 51:
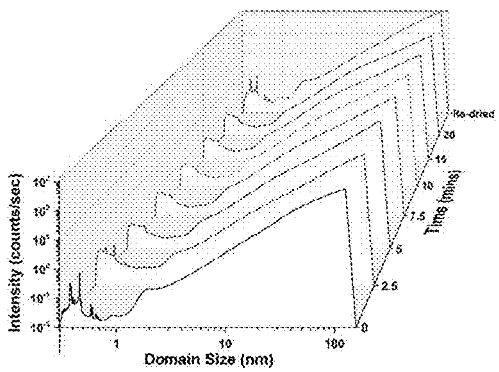
FIG. 51 depicts properties of non-covalent crosslinked PEO.
Figure 51:
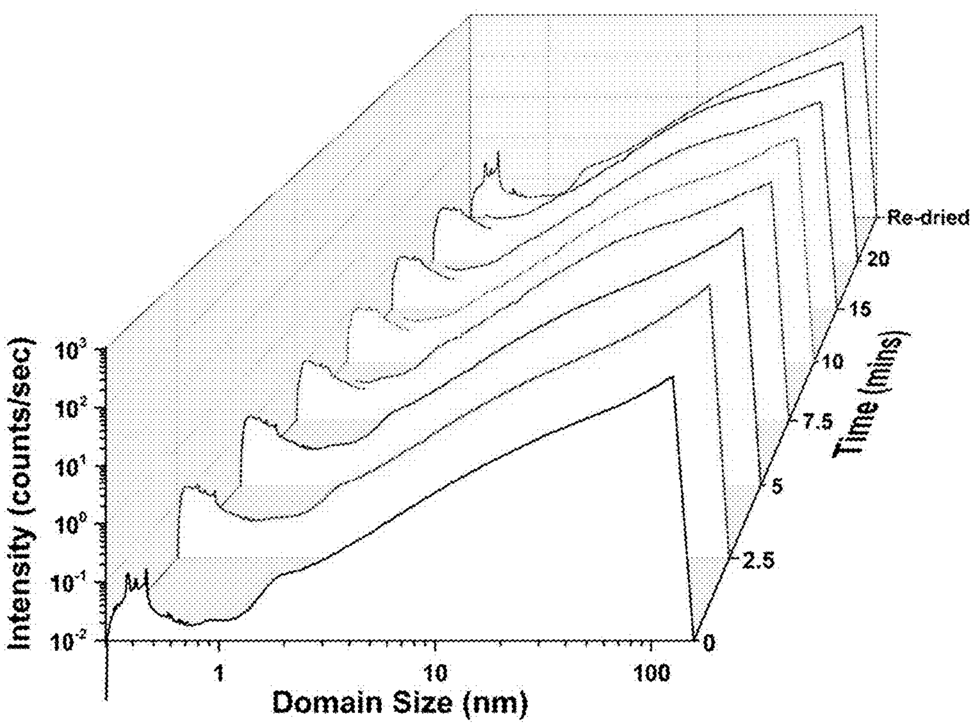
Figure 52:
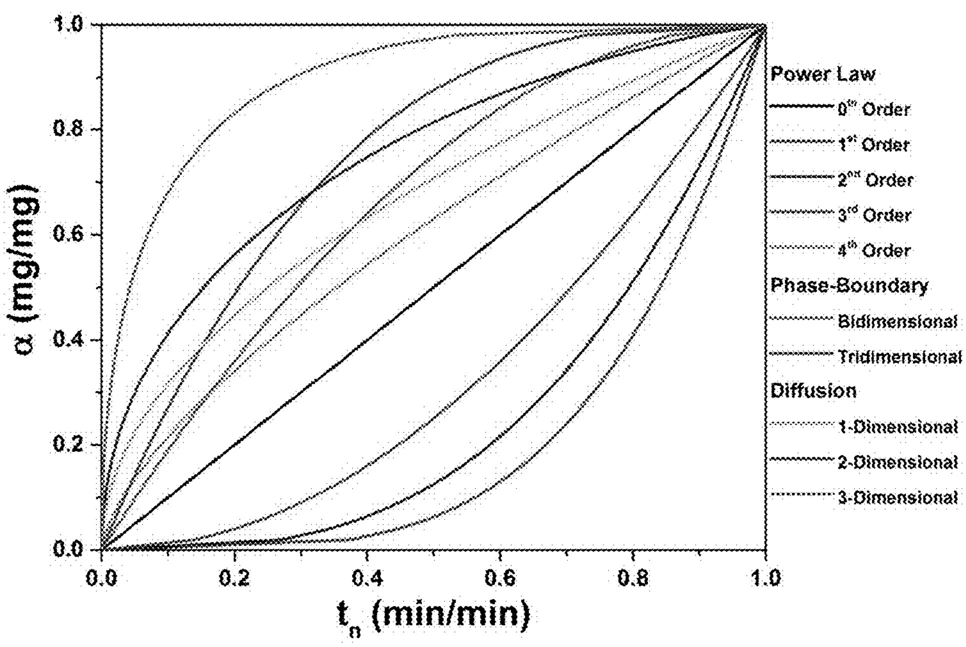
FIG. 52 depicts various swelling models.

FIG. 47 depicts non-covalent crosslinking of PEO. As illustrated in FIG. 47, exfoliated silicate particles will form non-covalent supramolecular crosslinks between high molecular weight PEO chains and becoming swell-able in the presence of water, i.e., a hydrogel. The following protocol was used to evaluate non-covalent crosslinking of PEO. A stock solution is prepared from $10^{-3}$ M NaCl in distilled $H_2O$. Dissolve 61.8 mg PEO/PCL composite in 1.6 ml stock solution, where PEO/PCL composite contains 3 wt % PCL (1.8 mg PCL+60 mg PEO). Add 40 mg laponite clay. Vortex mixing at 800 rpm for 90 minutes. The result is 6 wt % gel with 60:40 (PEO:Laponite) as depicted in FIG. 49. The nomenclature is $NC_6PEO_{60}LDR_{40}$. FIG. 50 depicts properties of covalent crosslinked PEO, and FIG. 51 depicts properties of non-covalent crosslinked PEO. FIG. 52 depicts various swelling models.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

The invention claimed is:

1. A method of fabricating a composite material comprising the steps of:

using a multilayer extrusion process to combine two materials into a composite material, the multilayer extrusion process including the steps of:

providing a matrix material, where the matrix material is a hydrogel;

providing a plurality of fibers;

forming a first layer of matrix material;

forming a second layer of fibers on top of the first layer of matrix material to form a multilayer composite;

slicing the multilayer composite into a first multilayer composite and a second multilayer composite;

placing the first multilayer composite onto the second multilayer composite to form a third multilayer composite;

repeating the slicing step and layering steps until matrix material and plurality of fibers forms the composite material comprising a fiber reinforced hydrogel;

dissolving the fiber reinforced hydrogel into a solution of water and a crosslinker;

evaporating the water to form a dry film;

crosslinking the dry film; and swelling the dry film with water to form a second fiber reinforced hydrogel.

2. The method of claim 1, wherein the matrix material is poly(ethylene oxide).

3. The method of claim 2, wherein the plurality of fibers are poly(ε-caprolactone).

4. The method of claim 1, wherein the crosslinker is pentaerythritol triacrylate.

5. The method of claim 1, further including the step of applying ultraviolet light to the second fiber reinforced hydrogel to achieve crosslinking.

* * * * *